United States Patent
Laurence et al.

(10) Patent No.: US 10,664,508 B1
(45) Date of Patent: May 26, 2020

(54) SERVER-SIDE FILTERING OF UNSTRUCTURED DATA ITEMS AT OBJECT STORAGE SERVICES

(71) Applicant: Amazon Technologies, Inc., Seattle, WA (US)

(72) Inventors: Douglas Stewart Laurence, Mercer Island, WA (US); Ning Liao, Sammamish, WA (US); Josef Schiefer, Seattle, WA (US); Sameer Choudhary, Seattle, WA (US); Ruiwen Zhao, Seattle, WA (US); Michael Banfield, Seattle, WA (US); Fusheng Yuan, Kenmore, WA (US); Kaiwen Qu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 15/952,806

(22) Filed: Apr. 13, 2018

(51) Int. Cl.
*G06F 16/00* (2019.01)
*G06F 16/335* (2019.01)
*G06F 16/33* (2019.01)
*G06F 16/30* (2019.01)

(52) U.S. Cl.
CPC ............ *G06F 16/335* (2019.01); *G06F 16/30* (2019.01); *G06F 16/334* (2019.01)

(58) Field of Classification Search
CPC ....................................................... G06F 16/30
See application file for complete search history.

(56) References Cited

U.S. PATENT DOCUMENTS

| | | |
|---|---|---|
| 6,560,595 B1 | 5/2003 | Sanders et al. |
| 7,383,246 B2 | 6/2008 | Lohman et al. |
| 7,499,910 B2 | 3/2009 | Schneider et al. |
| 7,599,952 B2 | 10/2009 | Parkinson |
| 7,849,049 B2 | 12/2010 | Langseth et al. |
| 8,266,148 B2 | 9/2012 | Guha et al. |
| 2006/0248129 A1 | 11/2006 | Carnes et al. |
| 2013/0104251 A1 | 4/2013 | Moore et al. |
| 2015/0149491 A1* | 5/2015 | Redlich .................. G06Q 10/10 707/755 |
| 2018/0075107 A1* | 3/2018 | Park ........................ G06F 16/21 |

OTHER PUBLICATIONS

Wikipedia, "Netty Docs: User guide for 4.x", Retrieved from URL: https://nett.io/wiki/user-guide-for-4.x.html on Feb. 12, 2018, pp. 1-16.

* cited by examiner

*Primary Examiner* — Ajith Jacob
(74) *Attorney, Agent, or Firm* — Robert C. Kowert; Kowert, Hood, Munyon, Rankin & Goetzel, P.C.

(57) ABSTRACT

Unstructured data items are stored in an item collection. An access request comprising an input interpretation rule and a filtering criterion is directed to at least a portion of the item collection. Records are extracted from an unstructured data item using the input interpretation rule. A response to the access request is obtained, based at least partly in a determination that one of the records satisfies the filtering criterion.

20 Claims, 19 Drawing Sheets

SERVER-SIDE FILTERING OF UNSTRUCTURED DATA ITEMS AT OBJECT STORAGE SERVICES

BACKGROUND

More and more mission-critical applications are being implemented using network-accessible services, such as the kinds of virtualized computing services, storage services and the like which may be provided using the resources of provider networks or public cloud environments. Virtualized computing services, for example, may enable clients to utilize essentially unlimited amounts of compute power for their applications, with additional resources being automatically deployed as the application workload grows. Similarly, database and storage services may allow clients to store vast amounts of data using fast high-availability configurations.

A number of different types of data models may be supported by network-accessible services implemented within provider networks. In some cases, for example, relational data models may be used, while in other cases, key-value or "noSQL" models may be used. Services that enable clients to store large unstructured objects (e.g., as collections of bytes that are typically opaque to the service provider, with no requirements for schemas) represent another popular alternative. For example, some object storage services may allow clients to create individual objects that may reach terabytes in size, and access the objects using simple web services requests (such as "get", "put", and the like) directed to respective unique URLs designated for the objects.

In many cases, unstructured data items stored at a network-accessible service may be processed for so-called "big data" analytics applications, machine learning applications and the like. Large unstructured objects may be retrieved from the service to a set of computing platforms where a particular analytics application is to be executed; in some scenarios, however, only a relatively subset of the contents of the object may actually be required for the application. Enabling customers of object storage services to reduce the amount of data that has to be transferred for processing in a customized, application-specific manner, while still providing the benefits associated with web-services-based access to large unstructured data items, remains a non-trivial technical challenge.

Figure 1:
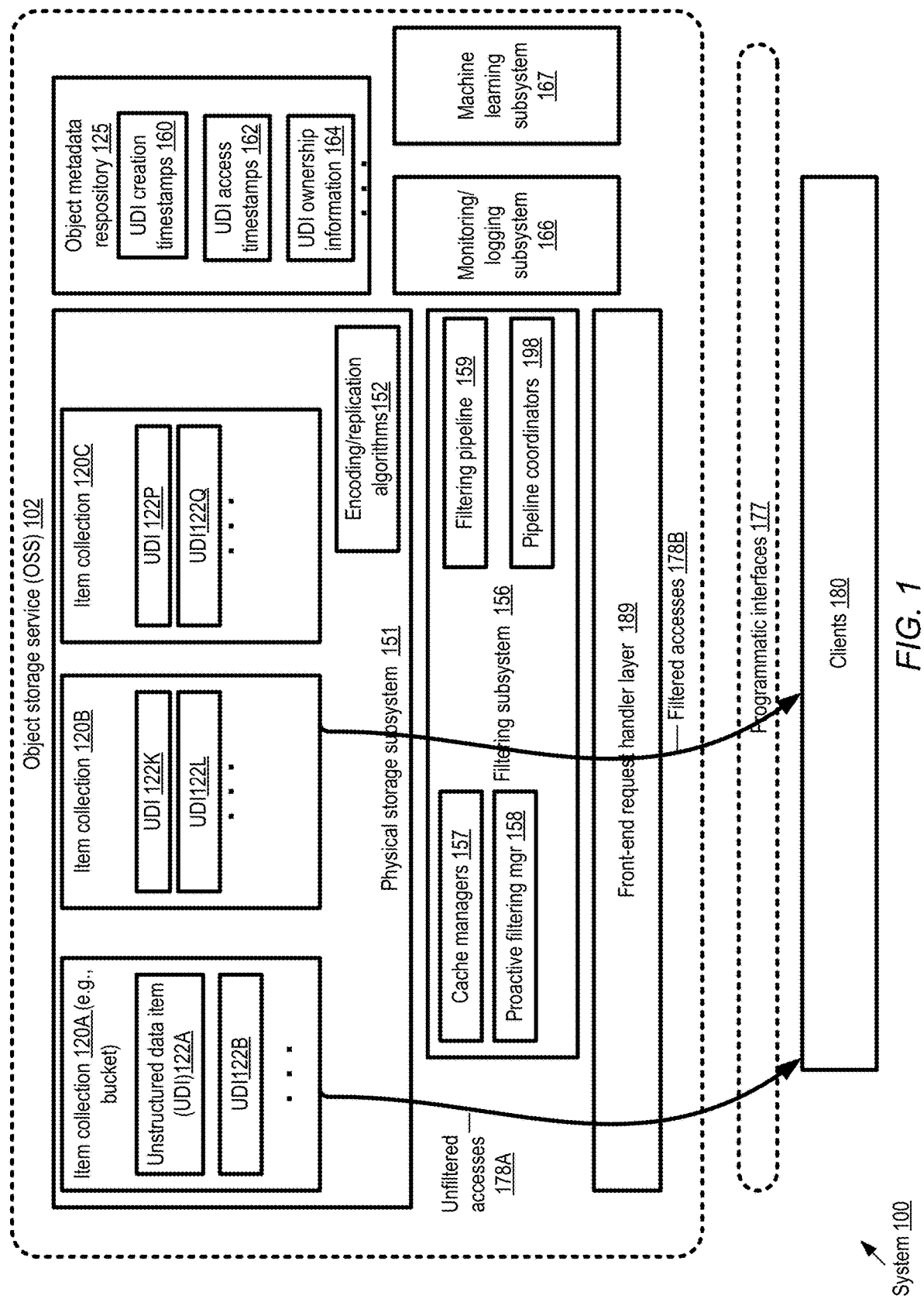
FIG. 1 illustrates an example system environment in which server-side filtering of unstructured data item contents based on client-provided criteria may be supported at a network-accessible object storage service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing server-side filtering at an object storage service, including optimization techniques for data filtering pipelines which may be implemented at such a service, as well as techniques for obfuscating potentially sensitive data within filtering-related log records which may be generated at such a service, are described. According to some embodiments, such a filtering framework may be implemented at a network-accessible object storage service of a provider network or public cloud environment. The service may, for example, enable clients to create, access and manipulate data items or objects comprising collections of bytes for which no specific schema indicating internal structure (e.g., fields or columns of the object) may be required, at least at the time of object creation or instantiation. From the perspective of the service, the semantics of the contents of individual data items may typically be unknown by default—e.g., the data types of subsets of an individual data item, even if it is several gigabytes or even petabytes in size, may not be provided to the service at the time that the item is stored at the service in various embodiments. Of course, the semantics and structure (if any) of the content of data items may be well known to the clients on whose behalf the items are stored. In some embodiments, the unstructured data items may be grouped into containers (named item collections, which may also be termed buckets)—e.g., a client of the service may first create a container, and then create individual data items within the container.

The unstructured data items (UDIs) may be accessed (e.g., via read requests submitted via programmatic interfaces) and analyzed for a variety of applications in different embodiments. For at least some applications, only a relatively small subset of the contents of a given UDI may be required. For example, consider a simple example scenario in which a given UDI comprises the content of a large number of transaction records of an e-retailer, with a given transaction record indicating the name of a sold item, a category of the item, a timestamp indicating when the transaction occurred, a price of the item, and address information of the purchaser. The unstructured data item may comprise a byte sequence or string representing 10000 such transaction records, e.g., with a selected delimiter (e.g., a new line character) separating the content of different transaction records, and another delimiter (e.g., a comma or tab) separating fields within a transaction record. To analyze the distribution of different categories of sold items across different geographic regions, the category and address fields may suffice, while the remaining fields may not be required. One way to perform this example analysis would be to retrieve the entire object to a set of computing devices where the analysis computations are to be performed, and extract the subset of item contents at those computing devices. In at least some embodiments, however, the service at which the UDIs are stored may support filtering on the server-side: e.g., the required subset of UDI contents may be extracted at the service based on filtering criteria or requirements specified by the client, and only the filtered results may be provided to the platforms where the application is to be run. The subcomponents of the service which are responsible for identifying the subsets of the UDIs which are to be provided to clients in response to access requests may be referred to in some embodiments as a filtering subsystem, filter evaluation subcomponents, a filtering pipeline, and/or a query subsystem. Filtering criteria or requirements may also be referred to as filtering queries in some embodiments.

As one skilled in the art will appreciate in light of this disclosure, certain embodiments may be capable of achieving various advantages, including some or all of the following: (a) reducing the amount of network traffic and/or storage space required for various types of applications from the perspective of a client of an object storage service, and/or (b) reducing, by utilizing potentially far more powerful computing resources may be accessible at the object storage service than are available to clients, the overall time required to complete processing of at least some applications that involve the analysis of items stored at the object storage service. The time taken to extract the relevant subsets of the data from the UDIs at the service may be further reduced with the help of several types of optimizations in some embodiments, such as abandoning further parsing of some portions of a UDI based on character-level tests or cached mappings between raw UDI elements and filtering decisions, as discussed below in further detail. In at least some embodiments, potentially sensitive data regarding UDI contents that could potentially be revealed in client-supplied filtering criteria may be masked or hidden in the log records of filtered accesses that are generated by the service, thereby helping to ensure the security of clients' private data.

According to at least some embodiments, a plurality of unstructured data items (UDIs) of an item collection may be stored at one or more storage devices of an object storage service (OSS), e.g., in response to one or more programmatic requests. The content of a given UDI may vary based on the applications and/or sources of the stored data—e.g., in some cases, delimited text records may be stored in a UDI, while in other cases the contents of an API may include a text or multimedia document such as a web page, still photographs, video, audio, raw sensor data, and the like. A number of techniques may be used to ensure high availability and resiliency of the UDIs in different embodiments—e.g., various types of erasure coding, redundancy/replication algorithms and the like may be used. A wide variety of underlying physical storage device types may be employed in some embodiments—e.g., any combination of fast-access-time rotating disks, slower-access-time archival devices, solid-state drives, and/or main memory may be used. In at least one embodiment, the service may be implemented at a provider network, and a set of web-services interfaces (e.g., Representation State Transfer or REST application programming interfaces (APIs)) may be used to create and access the UDIs. A request to access or retrieve at least a portion of contents of one or more UDIs of the item collection may be received (e.g., via a GET REST API request) in various embodiments. Components of the OSS may determine whether the access request comprises a filter descriptor which includes a serialization or input transformation specification, and a filtering criterion (expressed, for example, in the form of a query expressed in a language similar to Structured Query language or SQL) in some embodiments. From the storage devices at which the UDI was stored, one or more formatted records may be extracted using the serialization specification indicated in the access request in some embodiments. A response to the access request may be generated based at least in part on determining the subset of records which meet the filtering criteria (e.g., by satisfying one or more query predicates indicated in the access request) in various embodiments. The response may be transmitted to one or more destinations in various embodiments, such as the requester from which the access request was obtained. Access requests directed to the object storage service which include filtering criteria, requirements or queries pertaining to the unstructured data items stored at the service may be referred to as filtered access requests in some embodiments.

In at least some embodiments, the access request may also include an output transformation specification, indicating whether the filtered subsets of content of the UDI are to be modified or re-formatted prior to transmission of the response, and if so, how the filtered subsets are to be re-formatted or transformed. For example, in one embodiment, the formatted records extracted from the raw UDI may in effect comprise comma-separated variables, and the output transformation specification may indicate that selected subsets of the records are to be formatted according to JSON (JavaScript Object Notation).

According to at least one embodiment, at least a subset of the filtering results obtained for a given access request may be cached at the object storage service, and potentially re-used for subsequent access requests. For example, it may be possible for the OSS to determine in one such embodiment that the set of UDIs to which an access request with a filtering request FR1 was directed have not been modified (or replaced with newer versions of the UDIs) since FR1 was processed and the results of FR1 were cached. When a new access request with a new filtering request FR2 is received at the OSS, the filter evaluation components of the OSS may attempt to determine, e.g., based on query text analysis, whether a result set of FR2 can be obtained from at least a portion of the earlier-cached filtering results; if so, a response to the new access request may be provided from the cache in such embodiments.

In one embodiment, the filtering subsystem of the OSS may include one or more proactive query managers, responsible for determining whether it would be beneficial to process some types of filtering operations in advance of receiving access requests which specifically demand such filtering operations, so that the results of the proactive operations may be used to respond more quickly to the access requests. For example, in one embodiment, based on an analysis of a set of previously submitted programmatic requests directed to the item collection (e.g., log records indicating that a client tends to regularly submit a filtered access request of a particular type at a certain time of day), a predicted filtering criterion anticipated within a future programmatic access request from a client may be identified. A result set of the predicted filtering criterion may be obtained and cached at the filtering subsystem of the OSS in such an embodiment, and used to generate a response to a subsequent access request of the anticipated type.

In some embodiments, the filtering subsystem of the OSS may identify a number of short-cut tests which can be used to skip further processing of some records extracted from an unstructured data item, thereby reducing the overall time taken to prepare the response to an access request which includes a filtering criterion or query. In at least one embodiment, a query that comprises one or more predicates may be identified from an access request. Based at least in part on an examination of the one or more predicates, one or more character-level tests that can be used to determine, without completing parsing of a particular record identified within an unstructured data item, whether the particular record satisfies the query may be identified in some embodiments. In response to determining, using the character-level tests, that a particular record does not satisfy the query, further parsing of the record may be abandoned in various embodiments, and a response to the access request which does not include the particular record may be generated using a subset of other records of the unstructured data item. Of course, if a character-level test definitively indicates that a particular record does satisfy the query, the record may be designated as belonging to a result set to be used to respond the access request, without further parsing and analysis of the record.

In some embodiments, in order to identify the character-level tests, a transformed/parsed version of the filtering criterion or query, such as an abstract syntax tree (AST) may be generated and examined. In at least one embodiment, a character-level test may comprise determining that the number of characters which collectively make up a particular field of the record exceeds a threshold, or is less than a threshold. For example, if the filtering criterion predicate contains a necessary inequality similar to "field F1 is greater than 100", and the field is known to contain positive base-10 integers expressed as a sequence of characters, the OSS may determine that the inequality would not be satisfied if the length of the field were less than three characters (since the minimum number of characters needed for an integer to be greater than 100 is three). In some embodiments, character-level prefix mismatches may be used to shirt cut the parsing and evaluation of a record—e.g., if a necessary condition for inclusion of a record in a result set is something similar to "state='red'" and the first character of the state field of a record is not 'r', further parsing and evaluation of that record may be abandoned, and so on.

According to some embodiments, tuples indicating mappings between subsets of UDI contents (e.g., at the character or raw data level) and the decisions as to whether the UDIs met the filtering criteria may be cached at the OSS, and used to shortcut or bypass one or more stages of the filtering pipeline. For example, if the string "401" appears in several different records extracted from a given UDI, and the presence of the string is always correlated with the inclusion of the corresponding record in the filtered result set, a tuple ('401', "include-in-result-set") may be cached. Subsequently, when a newly-extracted record is parsed, and the character sequence '401' is encountered, further processing of the record may be abandoned based on the presence of the cached tuple, and the record may be included in the result set.

In at least one embodiment, an event-driven state machine may be implemented for the combination of parsing and evaluating filtering criteria or queries. For example, instead of parsing the entire record first and then evaluating various field-based predicates indicated in the filtering criteria, individual predicates of the filtering criteria may be evaluated as soon as the corresponding field contents are parsed in such an embodiment. In effect, as soon as the parsing of a particular field is completed, the corresponding predicate evaluation(s) (if any) may be triggered.

According to various embodiments, respective log records may be generated at the object storage service corresponding to individual access requests. Such log records may be usable for several purposes by the administrators of the service, such as debugging/troubleshooting, performance analysis, usage trend analysis, and so on. In order for the log records to be used for such purposes, at least some indication of the kinds of filtering criteria (if any) that were included in the requests may typically be included in the log records. However, recall that by default, in at least some embodiments the semantics of the contents of the data items stored at the service may be expected to be unknown at the service. It may sometimes be the case that certain types of filtering criteria may, unless certain precautions are taken when generating the log records, potentially reveal sensitive information.

To help avoid such undesired revelations or exposure of sensitive information, in various embodiments, one or more obfuscation or masking techniques may be implemented for log records pertaining to filtered accesses. In some embodiments, a determination may be made that a filtering criterion or query, expressed as a sequence of text tokens, is to be used to identify subsets of data for inclusion in a response to an access request directed to one or more unstructured data items of an item collection of an object storage service. A tree representation (or some other similar transformed/parsed representation) of the filtering criterion, such as an abstract syntax tree, may be generated in one embodiment. The tree representation and one or more security rules may be used to identify a target set of tokens of the filtering criterion that are to be obfuscated within a log record stored at the service for the access request in some embodiments. Substitute tokens corresponding to the target set of tokens may be generated, and used to populate the log record instead of the original tokens of the target set in various embodiments. The log record may be stored and used to perform one or more analysis operations (such as debugging, performance analysis and the like) in some embodiments.

In one embodiment, one or more literal tokens (e.g., numeric values, string constants, etc.) of the filtering criterion or query may be identified as members of the target set. In another embodiment, a dictionary of sensitive terms (e.g., including words such as "profit", "revenue", "identifier", etc.) may be used to look up tokens that are to be obfuscated. In at least some embodiments, clients of the object storage service may indicate security requirements for their data, which may for example indicate the kinds of tokens to be obfuscated and the obfuscation methodology to be used for the tokens. In one embodiment, in order to preserve some useful characteristics of the to-be-obfuscated tokens without revealing the actual tokens, substitute tokens which have the same length or share some common properties with the to-be-obfuscated tokens may be generated. Random strings (or numerals) of the same length as the original tokens may be inserted in place of the original tokens in some embodiments. Deterministic functions may be used to map the original tokens to their substitute versions in some embodiments, thereby enabling two identical filtering criteria to result in the generation of two identical log records without revealing the original tokens—in this way, the presence/absence of repeated queries may be tracked in the log. In some embodiments, obfuscation may be performed on fields or tokens which comprise image, video, or audio data, e.g., in addition to the obfuscation of text or numeric data.

Example System Environment

FIG. 1 illustrates an example system environment in which server-side filtering of unstructured data item contents based on client-provided criteria may be supported at a network-accessible object storage service, according to at least some embodiments. As shown, system 100 comprises various resources and artifacts of a network-accessible object storage service (OSS) 102. Clients 180 of the object storage service may submit requests via programmatic interfaces 177 (e.g., one or more web-based consoles, application programming interfaces (APIs), command-line tools, graphical user interfaces and the like) to perform various types of storage-related operations. For example, a client may request the creation of an item collection 120 (sometimes referred to as a bucket), such as collections 120A-120C, and then create, read, modify/update/rename and/or delete various individual objects or data items within the collections 120. In the depicted example, unstructured data items (UDIs) 122A and 122B may be created within container 120A, unstructured data items 122K and 122L may be created within container 120B, unstructured data items 122P and 122Q may be created within container 120C, and so on. The data items may be termed unstructured in that, at least for some items of some containers, there may be no requirement that a client indicate a schema or define a set of content attributes or columns, either at the time that the item is created or at any later stage of the lifecycle of the data item in the depicted embodiment. Instead, from the perspective of the object storage service 102, an unstructured data item may at least initially be treated as an opaque collection of bits or bytes.

An object metadata repository 125 of the OSS 102 may comprise such metadata as creation timestamps 160 of the various items, access timestamps 162 (e.g., when an item was last read or modified), and/or ownership information 164 (e.g., information indicating the identity of the specific clients 180 on whose behalf the containers and/or items are created, the identities of clients to whom administrative privileges to create/modify security rules associated with items or containers have been granted, and so on). Any of a variety of storage device types may be used to store the object contents (e.g., within physical storage subsystem 151) and metadata in various embodiments—e.g., a distributed collection of rotating disk-based storage devices, solid-state devices, and the like spread among multiple data centers may be used to achieve desired levels of data resiliency and availability. In at least some embodiments, various types of encoding and/or replication algorithms 152 may be employed to achieve targeted resiliency, performance, and storage resource utilization levels.

The object storage service 102 may comprise a front-end request handler layer 189, as well as a filtering subsystem 156 in various embodiments. In the depicted embodiment, clients 180 may submit at least two types of access or read requests directed to the UDIs 122—unfiltered access requests 178A, as well as filtered access requests 178B. In response to an unfiltered access request 178, the OSS 102 may provide a response which contains all the content of one or more UDIs 122 of one or more item collections 120 in the depicted embodiment. In contrast, in response to at least some filtered access requests 177, only a subset of the contents of one or more UDIs 122 may be returned with the help of the filtering subsystem 156 in the depicted embodiment. In various embodiments, the front-end request handler layer 189 may determine, e.g., based on the parameters indicated in a given access request, whether the request is to be processed at the filtering subsystem 156 or not. If the request is to be processed at the filtering subsystem, a representation of the request may be transmitted to a pipeline coordinator 198 in at least some embodiments. A pipeline coordinator 198, which may be implemented using one or more computing devices, may analyze filtering-related properties or requirements of the request and initiate operations corresponding one or more stages of a filtering pipeline 198 in various embodiments.

In at least some embodiments, results of some filtering operations performed using the pipeline 159 may be stored temporarily in a cache managed by one or more cache managers 157 at the filtering subsystem 156; such cached results may be used to avoid having to access the physical storage subsystem for some filtered access requests as discussed below in further detail. In at least some embodiments, the temporal patterns of various filtered access requests may be analyzed at the filtering subsystem 156, e.g., by a proactive filtering manager 158, and the probability of occurrences of future filtered access requests may be predicted based on the patterns. If a particular filtered access request is expected to occur with a high probability, in one embodiment, a result set corresponding to the predicted request may be generated in advance of the actual occurrence of the request, and stored in a cache. The proactively generated result set may then be used if/when the predicted filtered access request is received.

In at least some embodiments, the OSS 102 may comprise a monitoring and logging subsystem 166, which may be used to obtain and analyze metrics pertaining to a variety of operations performed at the OSS. In some embodiments, metrics may be collected at one or more stages of the filtering pipeline 159 for different types of filtered access requests, and used to automatically tune parameters such as the counts of concurrent threads of execution at individual stages, the amount of memory made available to different stages, the sizes of batches in which records extracted from the UDIs based on filtering requirements are processed, and so on. In at least one embodiment, the OSS 102 may include or utilize a machine learning subsystem 167 to help tune the pipeline stage parameters and/or to improve the overall performance of the OSS.

In some scenarios, the sizes of individual UDIs 122 may be quite large—e.g., items that are petabytes in size may be supported by the OSS 102. Only a small subset of the contents of a given UDI may be needed for a particular client application; the client may therefore use filtered accesses 178 to reduce the amount of data that has to be transferred to the destination computing devices at which the client application is to be run, and to reduce the amount of memory/storage required at the destination devices. By indicating various aspects of a filtering requirement in an access request submitted via programmatic interfaces 177, a client 180 may be able to ensure that only the desired portions of the UDIs are included in a response to the access request. Furthermore, in at least some embodiments, clients may also be able to specify, in the access request, one or more transformations to be applied to the filtering results, before the results are transmitted to their destinations from the OSS 102. In one simplified scenario, for example, the raw data of a UDI may be stored in the equivalent of a CSV (comma separated variable) format at the physical storage subsystem, and the client may specify, in an access request, that a subset of variables of formatted records extracted from the UDI is to be returned in a JSON (JavaScript Object notation) format. Note that at least in some embodiments, a given UDI may be mapped in different ways to formatted records, depending on respective input interpretation guidelines provided by a client. For example, the same UDI comprising 10,000,000 bytes may be subdivided into 1000 records of 10,000 bytes each according to one input interpretation guideline provided in a first access request, and into 5000 records of 2000 bytes each according to another input interpretation guideline provided in a second access request. As such, the client may have substantial control over the manner in which the UDI content is to be interpreted and/or filtered in various embodiments.

In at least some embodiments, several alternative approaches towards filtering requirement specifications may be supported at the OSS. For example, clients may use an SQL-like language to indicate one or more queries to be used to select subsets of UDI contents, or regular expressions may be used. In some embodiments, storage devices of several different categories with respect to performance and/or cost-per-storage-unit may be employed at the physical storage subsystem, and contents of some UDIs may be moved among the categories based on the patterns of filtering requested by client, e.g., either automatically or after obtaining approvals from the clients. For example, if a client's submitted access requests indicate that 80% of the contents of a set of UDIs are read very rarely, the rarely-accessed subset may be moved from a fast, relatively expensive set of physical storage devices to a somewhat slower set of physical storage devices to obtain cost savings for a client.

According to some embodiments, a plurality of UDIs 122 may be stored on behalf of a client 180 in one or more item collections 120 at the OSS. In response to obtaining or receiving a programmatic request to retrieve or access at least a portion of an item collection 120, components of the OSS may determine whether the request indicates one or more filtering requirements (such as queries) in various embodiments. If the request includes an input serialization specification (e.g., rules to be used to interpret the raw data of a UDI for the purposes of at least the current request), formatted records may be extracted from the contents of the UDIs to which the access request is directed, and the filtering requirements may be evaluated with respect to the individual formatted records in at least some embodiments. In effect, the contents of the targeted UDIs 122 may be subdivided into at least two sets of formatted records: a first set (which may be termed a result set) whose records satisfy the filtering requirements, and a second set whose records do satisfy the filtering requirements. A response to the access request, whose contents are based at least in part on the first set, may be generated and transmitted to one or more destinations in various embodiments. In at least some embodiments, the contents of the result set may be re-formatted or transformed prior to the transmission of the response, e.g., based on output transformation requirements indicated in the access request.

The filtering pipeline 159 used to identify subsets of the UDIs 122 that are to be provided in response to access requests may comprise several stages in the depicted embodiment. In at least one embodiment, a given filtering requirement or query of an access request may comprise several logical predicates to be evaluated to determine whether a record extracted from a UDI 122 is part of a result set to be used for the response. Based at least in part on an analysis of the predicates, the OSS may determine one or more tests in some embodiments, such as various character-level tests, that can be used to avoid some steps or operations of one or more stages of the filtering pipeline. For example, by examining just the first few characters or bytes of a particular field of a given record as the record is being parsed, it may be possible to determine, without completing parsing of the record, and/or without transforming the field into an object of a particular data type such as an integer, whether the given record is going to part of the result set or not. As such, further processing of one or more records may be abandoned using such short cut tests in some embodiments, and the response to an access request may be generated using the results of the short cut tests. Such shortcuts or optimizations may help to further speed up the responses generated to filtered access requests in various embodiments.

As indicated earlier, in various embodiments log records of access requests may be stored at the object storage service 102, and used later for various types of analysis such as debugging, performance analysis and tuning, usage trend analysis, and so on. In some cases, the filtering requirements or queries submitted by clients 180 via interfaces 177 may comprise potentially sensitive data, such as various literals or constants. In some embodiments, the tokens used to express the filtering criteria or requirements of a given access request may be transformed at the OSS into a semantically richer representation such as an abstract syntax tree, prior to parsing and/or evaluating the content of the targeted UDIs. Such a transformed representation of the filtering requirements may be analyzed, using one or more security-related policies in some embodiments, in order to detect whether the tokens could reveal potentially sensitive data. If a set of target tokens containing such sensitive data is identified, in at least some embodiments substitute or masked tokens may be generated and included in log records instead of the original tokens.

Figure 2:
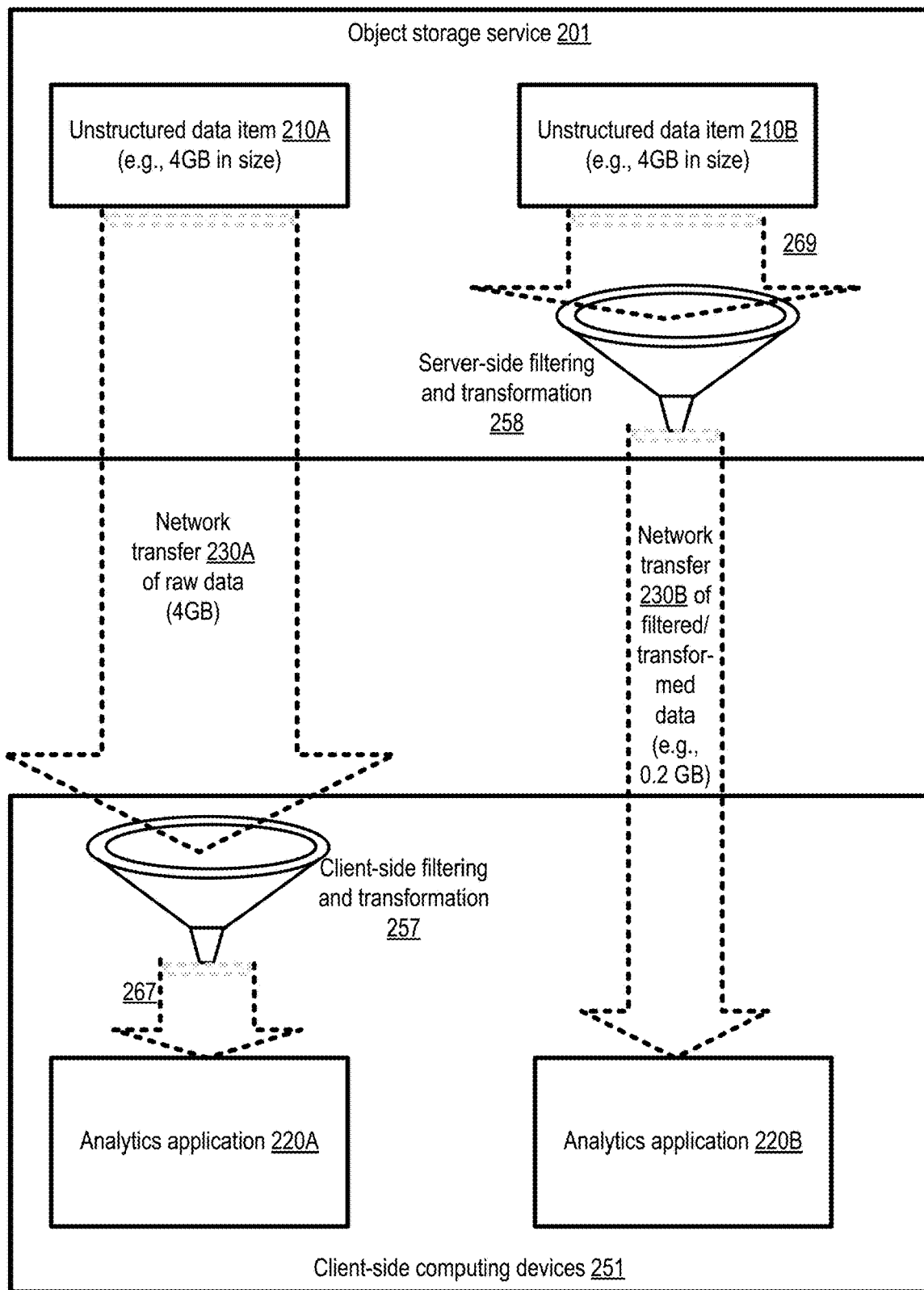
FIG. 2 provides a high-level overview of the benefits of server-side filtering of unstructured data items, according to at least some embodiments.

FIG. 2 provides a high-level overview of the benefits of server-side filtering of unstructured data items, according to at least some embodiments. In the depicted embodiment, analytics applications 220A and 220B are to be run at client-side computing devices 251 using contents of at least some UDIs stored at an object storage service 201. Consider two UDIs, 210A and 210B stored at the service 201, each comprising approximately four gigabytes of raw data.

In the case of application 220A, the client may have opted to use client-side filtering and transformation 257 of the unstructured data items whose contents are to be analyzed. Accordingly, a network transfer 230A of the entire four gigabytes of item 210 may be implemented. Once the contents of item 210A reach the client-side computing devices, a small subset of the contents may be extracted and provided as input to the application 220A, as indicated by the output 267 of the client-side filtering and transformation operations.

In the case of application 220B, in contrast, the client may have opted to use server-side filtering. Accordingly, raw data interpretation and filtering guidelines may be provided to the object storage service 201 in an access request. Such guidelines may be used to perform server-side filtering and transformation 258 of the contents of UDI 210B in the depicted embodiment, as indicated by arrow 269. The output of the server-side filtering and transformation operations may, for example, comprise just 0.2 gigabytes of data. The transfer 230B of the filtered and transformed data may therefore require far less network bandwidth than transfer 230A. At the client-side devices 251, the transferred data may be provided as input to the analytics application 220B. Considerable savings in network usage, memory usage at the client-side devices, and/or computation resource usage at the client-side devices may thereby be achieved in the depicted embodiment by using server-side filtering. Note that at least in some embodiments, a much more sophisticated and powerful set of computing resources may be available at the service 201 than may be available at client-side devices 251, which may make it even more beneficial to perform as much of the computation at the service, close to where the raw data is stored, as possible.

Access Request Elements

Figure 3:
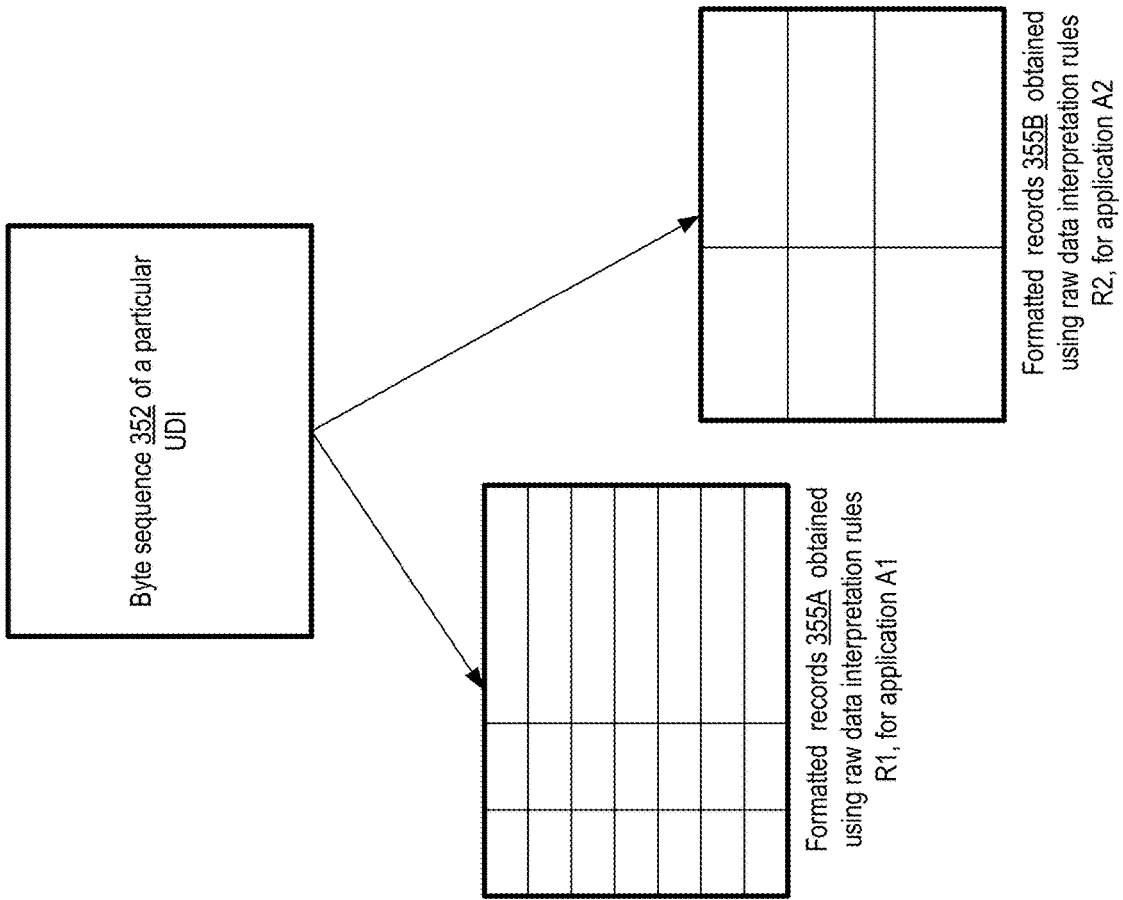
FIG. 3 illustrates example elements of an access request directed to one or more unstructured data items, according to at least some embodiments.
Figure 3:
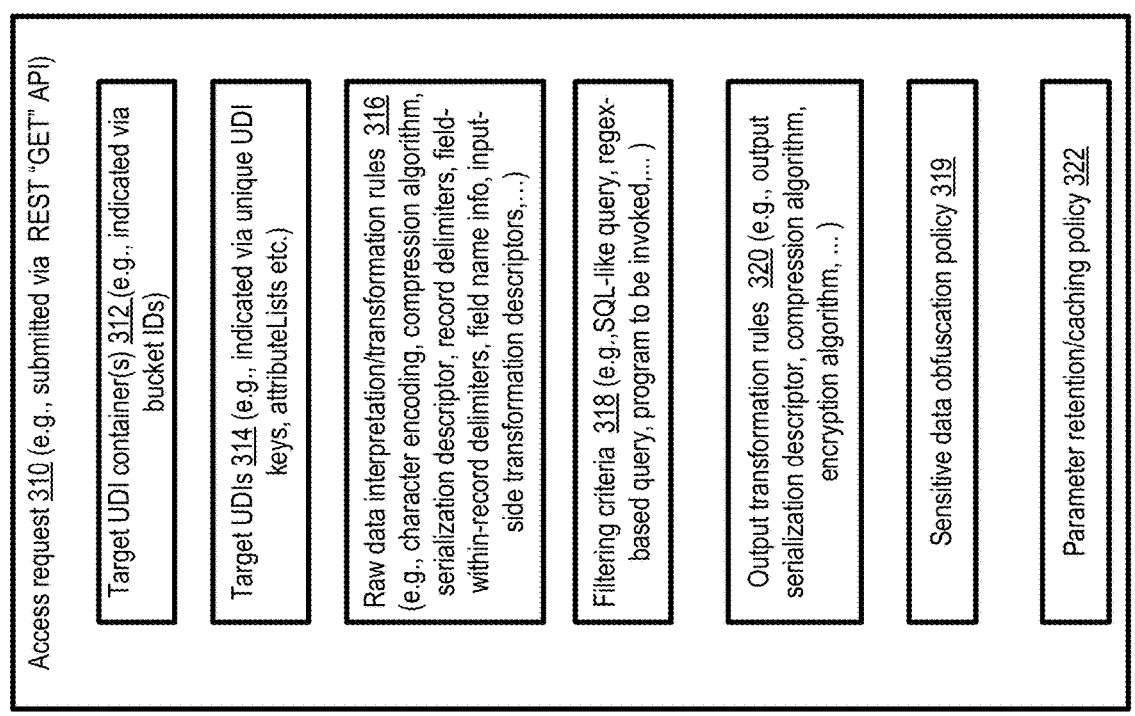

FIG. 3 illustrates example elements of an access request directed to one or more unstructured data items, according to at least some embodiments. In the depicted embodiment, access request 310, which may for example be submitted via a REST API such as a "GET", may comprise an indication 312 of one or more targeted UDI containers or collections and/or one or more targeted UDIs 314. In embodiments in which item collections or containers are assigned unique identifiers, one or more bucket IDs may be used to identify the containers from which the raw data is to be extracted. The indication of the specific target data items from which a subset (or all) of the item contents are to be used to generate the response to the access request may be provided in any of several ways in different embodiments—e.g., by providing unique identifiers or keys of the UDIs, by providing metadata attribute lists, and so on. As indicated in FIG. 1, a number of metadata attributes of UDIs in addition to item identifiers may be maintained at the object storage service in various embodiments, such as creation timestamps, access timestamps, ownership information etc., and one or more predicates expressed in terms of such metadata attributes may be used to initially identify one or more UDIs on which further filtering is to be performed.

One or more raw data interpretation or transformation rules 316 may be indicated in access request 310 in some embodiments; such rules may be used to subdivide a UDI into smaller records for the purposes of the access request. The interpretation rules may, for example, indicate one or more of: a character encoding, such as UTF-8 (Unicode Transformation Format—8-bit)) to be used to interpret the bits and bytes of the raw data, a compression algorithm (if compression was used) used for storing the raw data, a serialization descriptor indicating the format in which the data was stored (such as JSON or CSV), delimiters which can be used to distinguish among successive records within a given UDI, field-within-record delimiters indicating how a given record should be subdivided into fields, field name information (e.g., names or labels to be assigned to the sequence of field contents identified using field-within-record delimiters), other input-side transformation descriptors which indicate if/how the input data is to be processed prior to evaluating the filtering criteria 318 indicated in the access request, and so on. Consider an example scenario in which individual records are to be extracted from a given unstructured data items or objects using periods (".") as record delimiters, and individual fields are to be extracted from a given record using one or more whitespace characters as field-within-record delimiters. If K different fields are extracted from a given record, the field name information provided in the interpretation rules may, for example, indicate that in the sequence of K fields, the first field is to be considered a "last name" with respect to a filtering query, the second fields is to be considered a "first name" and so on. If a compression algorithm is indicated, a corresponding decompression algorithm may be employed to extract the contents of the UDI to respond to a filtered access request. In some embodiments, the contents of the UDIs may have been encrypted prior to storing, in which case a decryption algorithm or methodology (which may involve the use of one or more keys indicated in the request) may be specified in the request.

One or more filtering criteria 318 may be indicated in the access request to enable the object storage service to identify subsets of the records (generated using the interpretation rules) which are to be included in a result set to be used to prepare the response to the access request in the depicted embodiment. In some embodiments, an SQL-like query or queries may be specified as the filtering criteria. For example, if a given record extracted from the unstructured UDI can be subdivided into fields F1, F2, F3, etc., the query may contain Boolean combinations of one or more predicates such as (F1==A) AND ((F2==B) OR (F3==C)). The query may also indicate the subset of the fields to be included in the result set from a record which satisfies the query predicate in various embodiment: e.g., a query similar to "select (record.F1, record.F2) where (F1==A) AND "((F2==B) OR (F3==C))" may be used, or a query similar to "select record.* where (F1=A) AND ((F2==B) OR (F3==C)))" may be specified. Filtering criteria may be expressed using other languages or techniques in various embodiments—e.g., a syntax similar to that used for the Linux "grep" utility, in which regular expressions are used to indicate the subset of records to be retrieved, may be employed. In at least one embodiment, a program that is to be invoked at or by the object storage service to determine whether a given record is to be included in a result set may be specified by the client in an access request. Such a program may, for example, be executed using an event-driven computing service of a provider network, as discussed below in further detail, without requiring pre-allocation or advance provisioning of compute servers in some embodiments. In a scenario in which a client indicates a program to be used to filter record contents, the logic of the program may remain opaque to the service in at least some embodiments—that is, the conditions or predicates that are being evaluated by the program may not be exposed or revealed to the service.

In at least some embodiments, one or more output transformation rules 320 may be indicated in an access request. Such rules may optionally be used in such embodiments to indicate how one or more fields, whose values are extracted from records which satisfy the filtering criteria 318, are to be formatted or presented within the response to the access request 310. An output serialization descriptor (e.g., indicating that JSON or CSV should be used), a compression algorithm, and/or an encryption algorithm and the like may be indicated to specify the rules 320 in various embodiments.

In at least one embodiment, a client may indicate or refer to a policy 319 regarding obfuscation of sensitive data within log records corresponding to the access request. Such a policy may indicate to the object storage service whether, from the client's perspective, some of the tokens used for expressing the filtering criteria (and/or other elements of the access request) contain private or confidential information that should not be included in unmodified form in log records, and/or what types of obfuscation or masking operations should be implemented with respect to the sensitive data. In at least one embodiment, a client may also indicate a parameter retention and/or caching policy 322, indicating for example whether the client grants permission to the object storage service to perform various types of caching to enable responses to future access requests to be provided more quickly.

In some embodiments, some of the access request elements shown in FIG. 3 may be provided once for several (or all) access requests submitted by a client—e.g., the sensitive data obfuscation policy 319 and/or the parameter retention/caching policy 322 may be provided either at a global level, or at a per-access-request level. In some embodiments, defaults may be used at the object storage service for one or more of the elements shown in FIG. 3 if an access request does not include the element—e.g., a default sensitive data obfuscation policy may be used if none is specified in the access request, a default parameter retention/caching policy may be used if none is specified, and so on.

Depending on the use case or application, different interpretation rules 316 may be specified by a client to extract formatted records from a given UDI in some embodiments; that is, the manner in which unstructured data is to be understood or evaluated may be changed by a client by selecting the appropriate interpretation rules. For example, a byte sequence 352 of a particular UDI may be interpreted as comprising formatted records 355A in accordance with interpretation rules R1 for application A1, and as a completely different set of formatted records 355B in accordance with rules R2 for application A2. Rules R1 may indicate a different set of record delimiters and/or filed descriptors than rules R2 in such a scenario.

Programmatic Interactions

Figure 4:
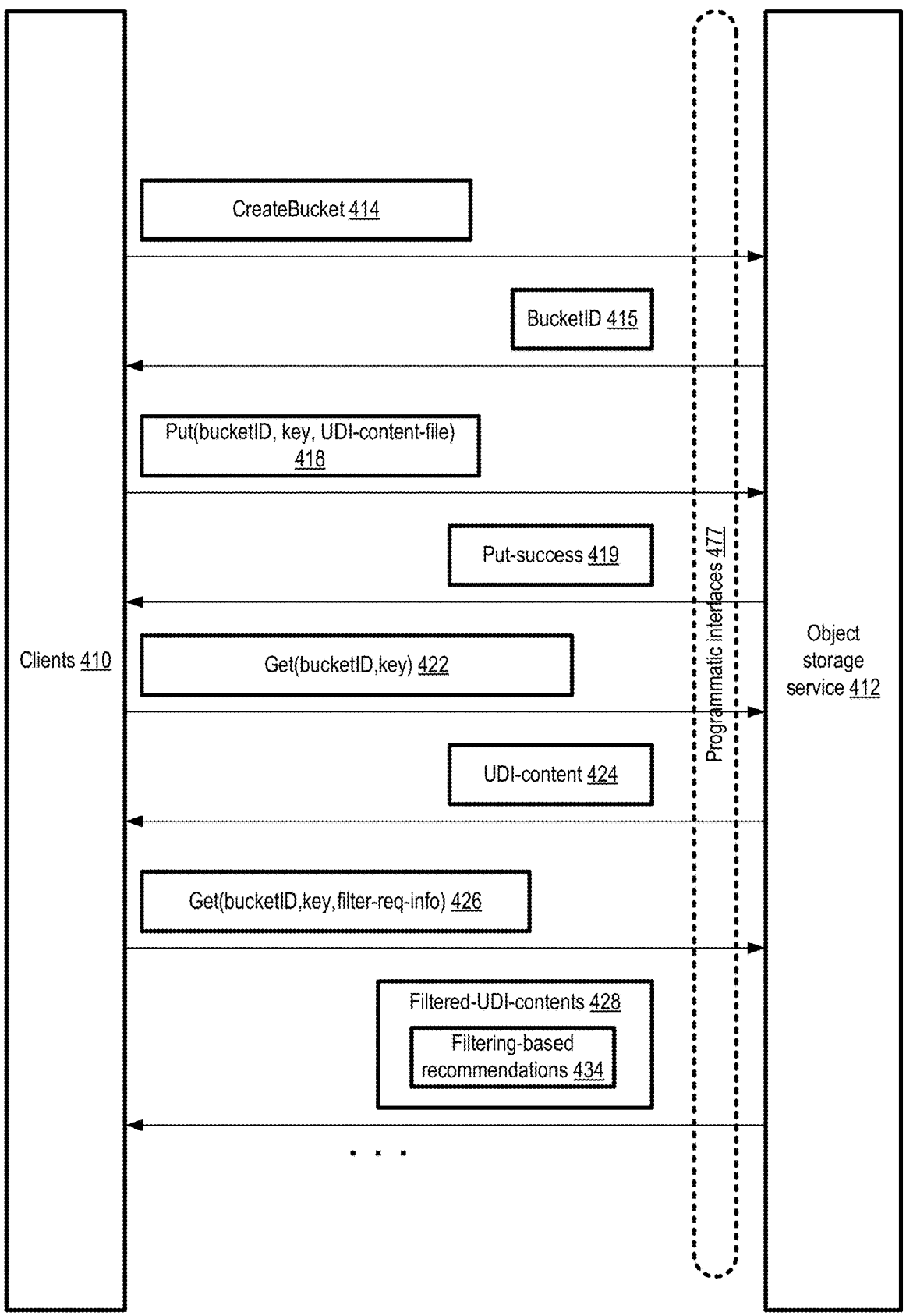
FIG. 4 illustrates examples of programmatic interactions between a client and an object storage service at which unstructured data items may be accessed using server-side filtering, according to at least some embodiments.

FIG. 4 illustrates examples of programmatic interactions between a client and an object storage service at which unstructured data items may be accessed using server-side filtering, according to at least some embodiments. In the depicted embodiment, one or more programmatic interfaces 477, such as a web-based console, a set of application programming interfaces (such as REST APIs or other web-service APIs), command-line tools, and/or graphical user interfaces may be used by clients 410 to request various types of storage-related operations from the service 412.

A client 410 may, for example, submit a CreateBucket request 414, indicating that a new item collection or container is to be created. Such containers may, for example, be used to group similar data items together. In response, the service 412 may store metadata representing a new container, and provide a bucket identifier 415 to the client.

In order to create new unstructured data item, in at least some embodiments a client 410 may submit a Put request 418. The Put request may, for example, include a parameter (e.g., bucketID) identifying the particular bucket within which the new UDI is to be created, a key or identifier of the UDI, and a file (UDI-content-file) comprising the raw data to be stored. In response to the Put request, the service 412 may store the specified data at one or more storage devices in accordance with applicable resilience and/or availability requirements in various embodiments. In addition, metadata pertaining to the UDI being stored, such as the creation time, creator ID, and the like may be stored in various embodiments, and an indication 419 that the Put succeeded may be provided to the client 410.

The client 410 may issue unfiltered and/or filtered access requests to read the items stored in the container in the depicted embodiment. To obtain unfiltered access, a Get request 422 which simply specifies one or more bucket identifiers and/or one or more UDI keys may be submitted. The entire unfiltered contents of the targeted UDIs may be returned in response 424. To obtain filtered access, a different version of a Get request 426 may be submitted, containing information (filter-req-info) pertaining to the filtering requirement. The elements of this second type of Get request may be similar in some embodiments to those discussed above in the context of FIG. 3—e.g., rules regarding interpretation of the raw data, the filter query or criteria, output transformations if any, and the like, may be included. In response, a workflow corresponding to a filtering pipeline may be implemented in at least some embodiments, and a response 428 derived from filtered UDI contents may be generated and transmitted to the client 410. In some embodiments, the object storage service may be able to provide some recommendations to the client 410 regarding future access requests—for example, a recommendation to move some data from one category of storage devices used at the object storage service to another types of storage device, or a recommendation regarding a different way to express the same type of filtering requirements may be provided.

It is noted that in various embodiments, a number of other types of programmatic requests may be supported by the object storage service than those shown in FIG. 4—e.g., requests to delete or modify UDIs may be submitted, or to change permissions associated with a bucket or a UDI may be submitted. In some embodiments, for example, programmatic interactions may be used to specify fine-grained (e.g., field-level) permission settings on portions of records extracted from unstructured data item. Consider a scenario in which individual records extracted from a UDI UDI1 may include fields A, B, C, and D. An authorized entity, such as the owner or creator of UDI1, may submit a programmatic request in some embodiments indicating, for example, that users belonging to a particular group are only allowed to access contents of fields A and C, while users belonging to another group are only allowed to access contents of field B. The object storage service may store records of such permissions, and verify, prior to processing or providing a response to a filtered access request, that the request does not violate the granted fine-grained permission settings in various embodiments. In some embodiments, one or more parameters used for various programmatic requests and/or responses may differ from those shown in FIG. 4.

Server-Side Filtering Pipeline

Figure 5:
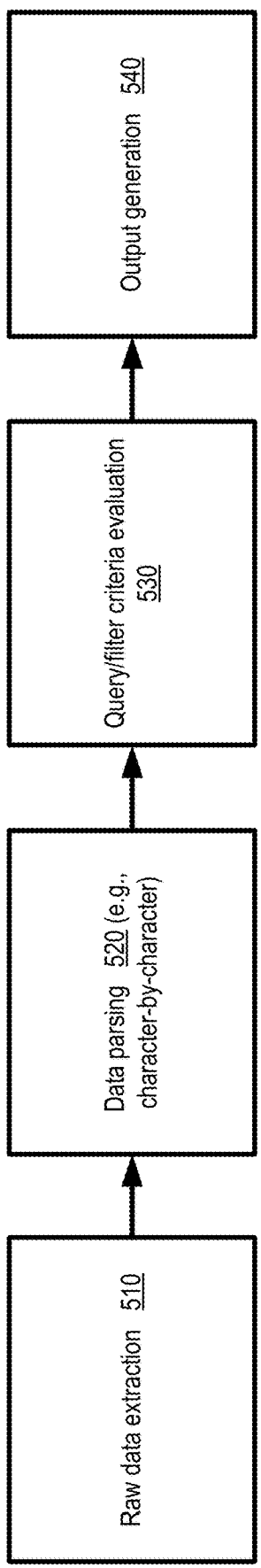
FIG. 5 illustrates example stages of a server-side filtering pipeline which may be implemented at an object storage service, according to at least some embodiments.

FIG. 5 illustrates example stages of a server-side filtering pipeline which may be implemented at an object storage service, according to at least some embodiments. As shown, at a high level, the pipeline may comprise at least four phases or stages in the depicted embodiment—raw data extraction 510, data parsing 520, filter criteria evaluation (or query evaluation) 530, followed by output generation 540.

In at least some embodiments, the stages shown in FIG. 5 may be implemented in a distributed and/or parallelized manner. For example, one or more threads of execution or processes, instantiated at a selected number of computing devices or servers, may be used for individual ones of the stages in one embodiment. The number of threads of execution to be used for a given stage may vary for different types of filtered access requests in at least some embodiments, and may be considered among the tuning parameters of the object storage service.

In one embodiment, for a given filtered access request, the phases may be executed sequentially for a given UDI or a set of UDIs. E.g., the raw data may be extracted first from a given UDI, and then fully parsed into tokens (e.g., using character-by-character parsing in accordance with a character encoding specified in the access request). The parsed tokens may be converted to instances or objects of various data types and evaluated with respect to the filtering criteria in such an embodiment, and then, after the parsed tokens extracted have all been evaluated, the result set of the filtering may be used to generate the output.

In some embodiments, at least some of the processing of the different phases may be performed in parallel. For example, an event-driven state machine may be used in one embodiment, at least for the combination of the data parsing and evaluation phases. Consider an example scenario in which a given filtering criterion or query comprises a plurality of predicates on respective fields of a record, including a first predicate on a first field and a second predicate on a second field. As soon as the first field is parsed from the raw data being examined, an evaluation of the first predicate may be triggered in embodiments in which event-driven state machines are employed; the first predicate with respect to a given record may therefore be evaluated prior to the completion of parsing of the second field. If the evaluation of the first field results in a decision regarding whether the record is going to be part of the result set of the filtering criterion or not, the remainder of the parsing and evaluation steps may not even have to be performed in such an embodiment.

Caching Filtering Results

Figure 6:
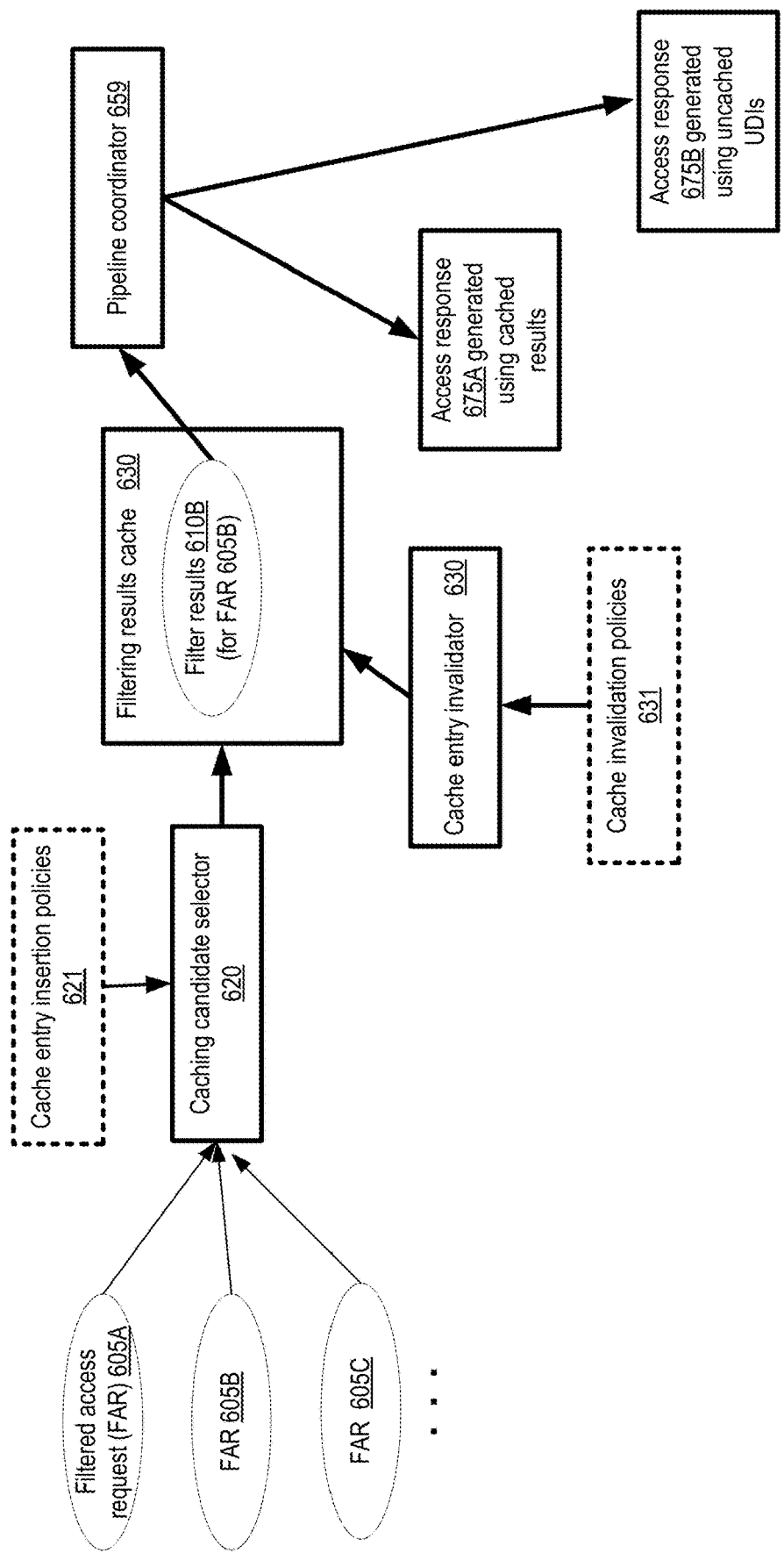
FIG. 6 illustrates an example use of a filtering results cache at an object storage service, according to at least some embodiments.

FIG. 6 illustrates an example use of a filtering results cache at an object storage service, according to at least some embodiments. In the depicted embodiment, the results of one or more filtered access requests (FARs) 605 may be stored temporarily in a cache 630, and the cached results may potentially be used to respond to subsequent access requests. As discussed above, the server-side filtering pipeline may comprise several stages in various embodiments; the entries that are stored in cache 620 may correspond to output generated at one or more of the stages in the depicted embodiment. For example, in some embodiments, the set of formatted records extracted in response to a particular FAR from one or more UDIs may be cached. In other embodiments, the particular fields that were specified for retrieval in the FAR (e.g., the fields record.A and record.B in a scenario in which the filtering criterion is a query similar to "select record.A, record.B from . . . ") may be cached. In yet another embodiment, if the FAR requests an output transformation, such as a conversion from CSV to JSON, the formatted output may be cached.

One or more cache entry insertion policies 621 may be implemented by caching candidate selector 620 to populate the cache 630 in some embodiments. For example, temporal repetition patterns detected with respect to one or more FARs 605 may be used to select a subset of the FARs whose results should be cached in one embodiment. Based on such a policy, the filter results 610B corresponding to FAR 605B may be cached (e.g., if FAR 605B, or other FARs which can be responded to using subsets of results 610B, appears to be submitted approximately every T minutes or hours), while results of FARs 605A and 605C may not be cached (e.g., because analysis of access patterns indicate that their results may not be re-used, or not re-used frequently enough). Other factors which may influence the selection of cache candidates may include the sizes of the result sets, how recently the results were generated, caching preferences indicated by clients, and so on. In one embodiment, a relatively simple caching policy similar to "cache the results of newly-submitted FARs as they become available, removing older results when the cache becomes full" may be used. In at least some embodiments, the cache entry insertion policies 620 may also indicate the stage of the pipeline whose outputs should be cached.

If the underlying unstructured data items from which the cached filtering results were derived are modified or deleted, the corresponding cached entries may have to be invalidated in various embodiments. One or more cache invalidation policies 631 may be implemented by invalidator 630 in the depicted embodiment. The cache entry invalidator 630 and/or the caching candidate selector 620 may be implemented using one or more computing devices. A combined cache manager implemented at one or more computing devices may perform both cache entry selection and invalidation in some embodiments. In one embodiment, according to a particular cache invalidation policy, as soon as a UDI whose content is cached in some form gets updated, all cache entries derived from that UDI may be invalidated. In other embodiments, according to a different cache invalidation policy, a determination may be made as to whether a write to a UDI would change the results of an FAR corresponding to a cache entry, if the FAR were re-submitted after the write, and a cache entry may only be invalidated if it would no longer be usable to respond to the re-submitted FAR. In at least one embodiment, the cache invalidator 630 may be invoked as part of the workflow for at least some write requests directed to UDIs. Note that in at least some embodiments, the object storage service may not update UDIs in place—instead, when a write is directed to a UDI, a new version of the UDI may be created and the existing version may be deleted.

Cache entry insertion policies and invalidation policies may be selected by the object storage service in some embodiments. In at least one embodiment, a client may request that particular caching-related policies be used for FARs directed to specified UDIs (or all UDIs accessed by the client). In embodiments in which caching of the kind illustrated in FIG. 6 is implemented for filtering results, when a new FAR is received, a pipeline coordinator 659 may determine whether the contents of the cache 630 can be used to respond. If the cache contains at least a portion of the requested data, an access response 675A may be generated using the cached results; otherwise, an access response 675B may be generated using un-cached UIDs in various embodiments.

Proactive Filtering

Figure 7:
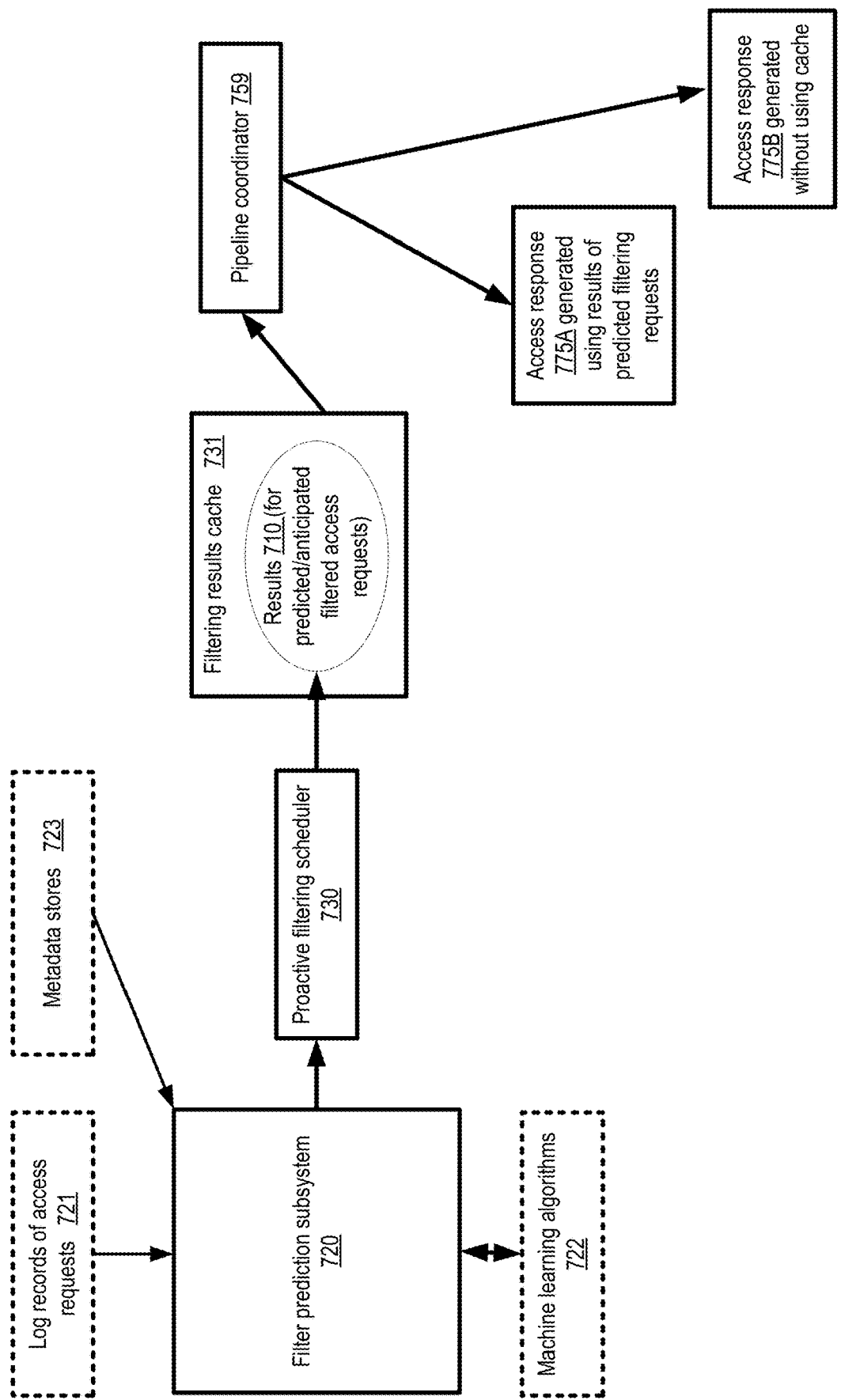
FIG. 7 illustrates an example use of proactive filtering at an object storage service, according to at least some embodiments.

FIG. 7 illustrates an example use of proactive filtering at an object storage service, according to at least some embodiments. A filter prediction subsystem 720 may examine log records 721 of access requests in the depicted embodiment, and use detected patterns of accesses to identify filtered access requests (FARs) that are likely to be submitted in the future. For example, the times of day at which various types of FARs are received, repetition patterns of the FARs received, the rate at which the UDIs to which the FARs are directed change, and the like may be taken into account to predict future FARs in some embodiments. In at least one embodiment, a machine learning algorithm 722 (e.g., a regression algorithm, or a neural network based deep learning algorithm) may be employed to make such predictions. In some embodiments, metadata pertaining to the data items stored at the object storage service may be accessed from one or more metadata stores 723 and used to help generate predictions regarding future FARs. In one embodiment, for example, a provider network at which the object storage service is implemented may also implement other services, such as an ETL (extract, transform and load) service, a machine learning service and the like at which the contents of the UDIs stored at the object storage service may be processed for various clients. Such other services may store metadata about the unstructured data items of various clients, including for example the underlying semantics or structure of at least some data items, how often the contents of the UDIs are analyzed at the other services, repetition patterns of such analyses, and so on, which may be helpful in making predictions of future FARs in some embodiments.

Filtering requests that are likely to be re-submitted may be provided to a proactive filtering scheduler 730 in some embodiments. The proactive filtering scheduler may utilize the server-side filtering pipeline to obtain results 710 of the anticipated filtering requests and store them in a cache 731. When new FARs are submitted, the pipeline coordinator 759 may determine whether the cache 731 comprises entries that can be used to respond. If so, an access response 775A may be generated using the cache 730; if the cache does not contain the requested data, un-cached UDI contents may be used to generate the response 775B in various embodiments. In some embodiments, a set of one or more memory or storage devices may be used to store cache entries corresponding to anticipated FRAs, as well as results of already-submitted FARs that have been selected as cache candidates. In other embodiments, separate caches may be used for the two kinds of entries.

Figure 8:
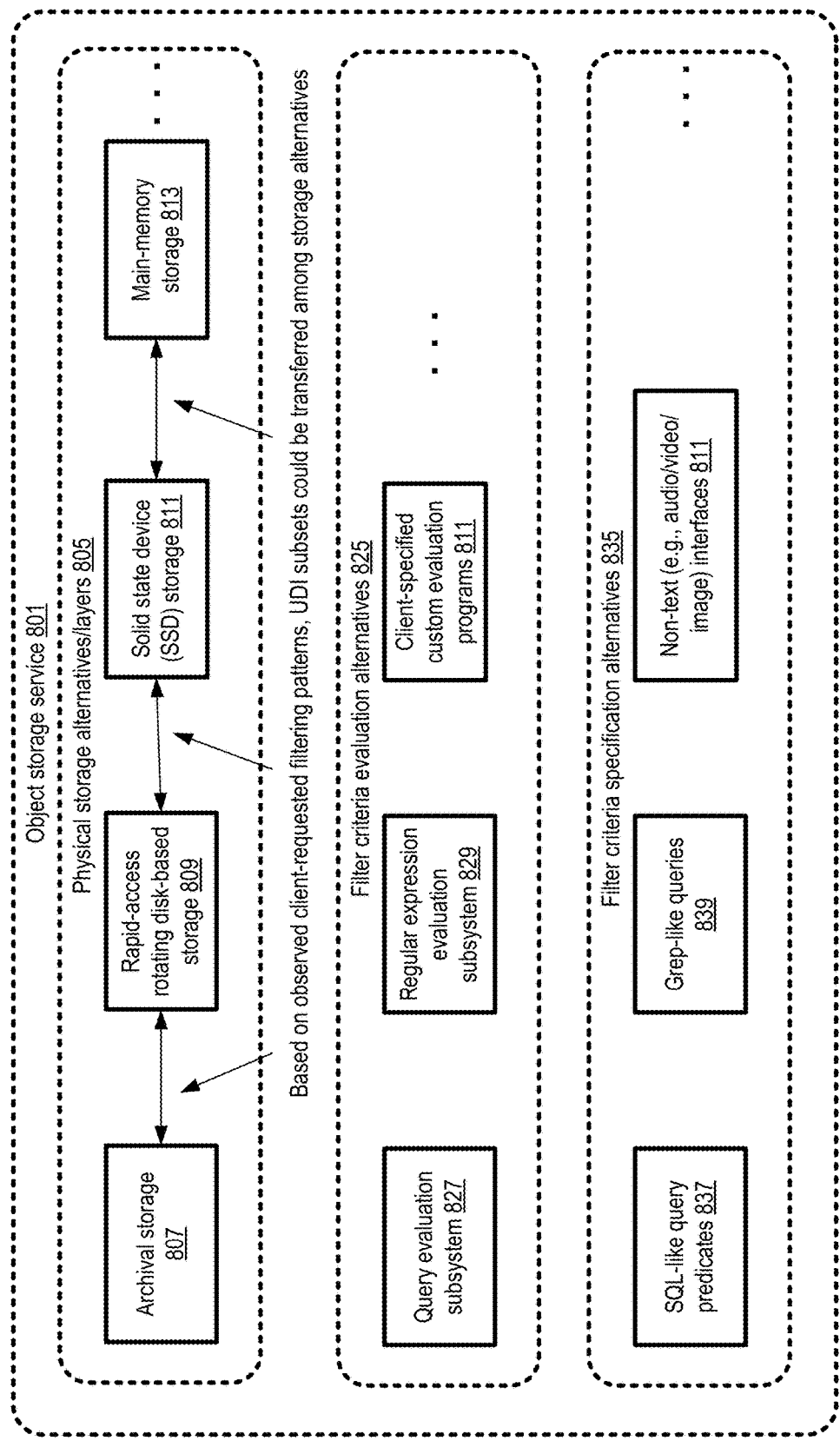
FIG. 8 illustrates examples of alternative approaches for physical storage, filter criteria evaluation and filter criteria specification at an object storage service, according to at least some embodiments.

Alternatives for Physical Storage, Filter Evaluation and Filter Criteria Specification FIG. 8 illustrates examples of alternative approaches for physical storage, filter criteria evaluation and filter criteria specification at an object storage service, according to at least some embodiments. As shown, the physical storage alternatives 805 offered by the service 801 may include (in order of faster average response times for accessing stored items) archival storage 807, rapid-access rotating-disk based storage 809, solid state device (SSD) storage 811, and/or main-memory storage 813 in some embodiments. The physical storage subsystem of the object storage service may be organized into respective layers in some embodiments, with a respective set of storage devices implementing each of the storage alternatives—e.g., the service may include a main memory layer, an SSD layer, a rotating-disk layer, and an archival layer. The archival layer may, for example, use slower disk devices, tape devices and the like in some embodiments. A given unstructured data item may be stored using one or more of the different storage device types in some embodiments. In at least one embodiment, portions of an item or an item collection may be distributed among, or replicated at, several different layers of the physical storage subsystem using respective types of storage devices. For example, a portion of an object that is accessed less frequently may be stored at "colder" storage such as archival storage, than other portions which may be accessed more frequently. In at least some embodiments, based on observed client-requested filtering patterns, subsets of the contents of various unstructured data items (UDIs) may be transferred among the physical storage layers. In at least one embodiment, before performing such a transfer for a given UDI, the service may obtain permission from the client on whose behalf the UDI was created. In one embodiment, the client may grant permission to the object storage service to move or transfer various data items, as long as desired response time targets are met for various types of operations on the items.

With respect to the manner in which filtering criteria can be expressed in access requests directed to the object storage service, alternatives 835 may include SQL-like query predicates 837, grep-like queries 839 and/or non-text interfaces 811 in the depicted embodiment. Users of various types of database management systems, including relational databases and the like, may be familiar with SQL and may prefer the SQL-like query language supported by the object storage service in various embodiments. Grep-like queries 839 may enable clients familiar with regular expressions to formulate fairly elaborate filtering requirements relatively succinctly in some embodiments. In at least one embodiment, filtering criteria may be expressed with respect to images, videos, audios and the like using interfaces 811—e.g., a client may request, by providing a picture of a car, that pictures of other cars that are part of the contents of UDIs within a given bucket or item collection be retrieved, or that pictures that do not contain cars be retrieved from some set of UDIs.

Corresponding to the different types of filtering criteria specification alternatives 835, the object storage service may implement alternatives for actually performing the requested type of filtering in various embodiments. A query evaluation subsystem 827 may be employed for SQL-based filtered access requests, a regular expression evaluation subsystem 829 may be used for grep-like queries, and so on in various embodiments. In at least one embodiment, clients may provide or indicate custom filtering criteria evaluation programs 811 to the object storage system, which may be employed for the client's access requests. In some embodiments, based for example on analysis of a client's item accesses, the object storage service may be able to provide recommendations to optimize various aspects of the interaction of the client with the service. For example, the service may suggest that some items be moved from one physical storage layer to another to save costs, or that a different types of filter criterion specification approach be used to sped up certain types of accesses.

Provider Network Environment

Figure 9:
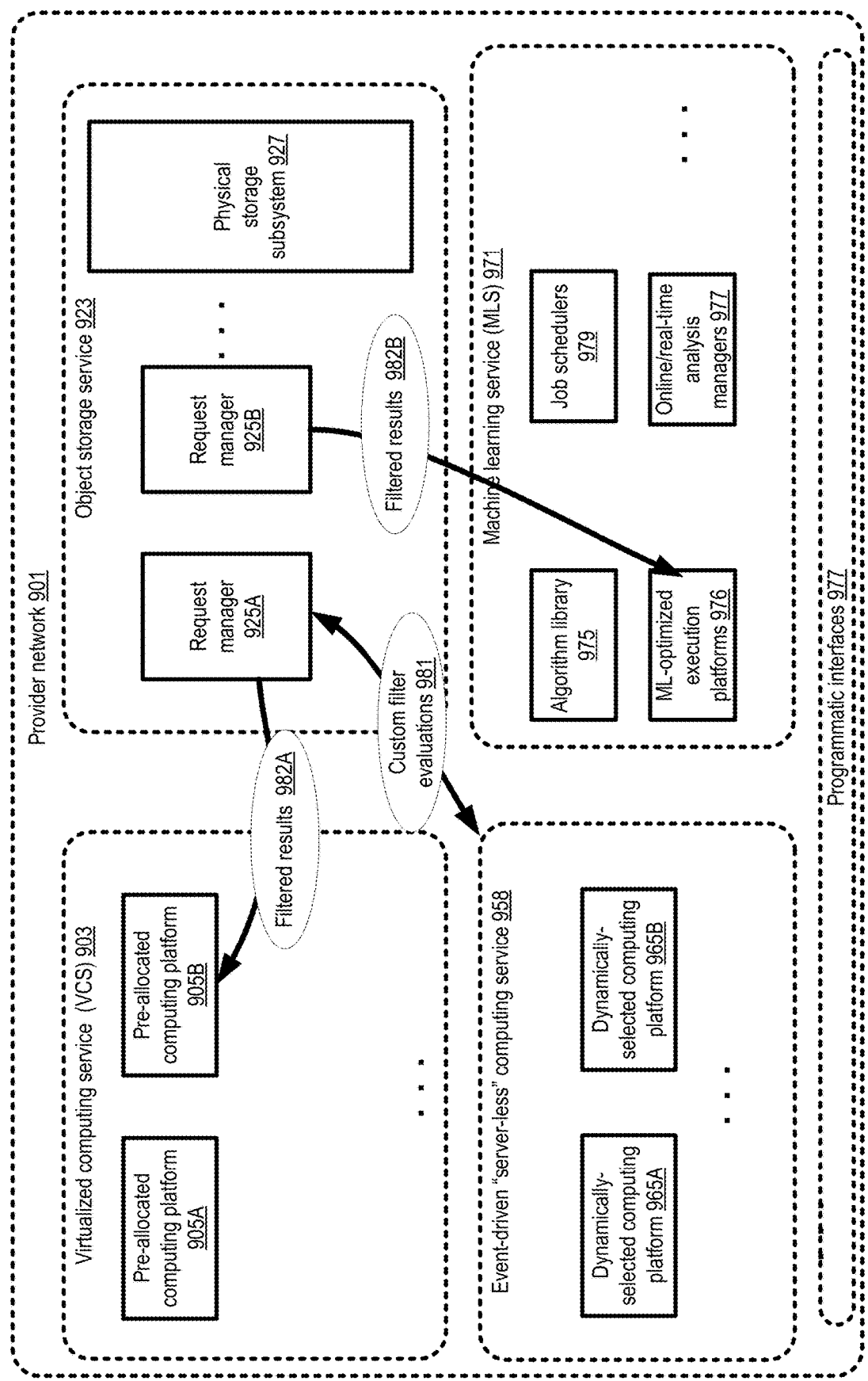
FIG. 9 illustrates an example provider network environment in which an object storage service may be implemented, according to at least some embodiments.

In some embodiments, as mentioned earlier, an object storage service may be implemented using provider network. FIG. 9 illustrates an example provider network environment in which an object storage service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtualized computing service (VCS) 903, an event-drive "server-less" computing service 958, an object storage service 923, and/or a machine learning service (MLS) 971. The storage service 723 may, for example, enable clients to store unstructured data items of arbitrary size using various types of devices of a physical storage subsystem 927. Request managers such as 925A and 925B may process programmatic requests directed at the unstructured data items—e.g., including requests to create, delete, read or write various types of data items. Access requests with and without filtering criteria specified may be handled in the depicted embodiment. Components of a given service may utilize components of other services in the depicted embodiment—e.g., for some machine learning tasks, a component of the machine learning service 971 may utilize pre-allocated virtual machines implemented at computing platforms of the virtualized computing service. The machine learning service may be utilized for tuning various parameters of the object storage service, and/or for predicting future access requests. Input data, intermediate results, final results and/or other artifacts of various machine learning algorithms or models, such as those used for tuning and predictions pertaining to the object storage service, may be stored at physical storage subsystem 927 of storage services 923 in some embodiments. Individual ones of the services shown in FIG. 9 may implement a respective set of programmatic interfaces 977 which can be used by external and/or internal clients (where the internal clients may comprise components of other services) in the depicted embodiment.

The event-driven computing service 958 may differ from the virtualized computing service 903 in that pre-allocation of specific virtual (or physical) machines may not be required at the event-driven computing service in the depicted embodiment. If a client of the provider network wishes to execute a relatively short-lived program, for example 958, the client may simply provide a representation of the program to the event-driven service, and indicate an event which is to trigger the execution of the program (the event may be the submission of a request to run the program for example, or the completion of another program). When a triggering event is detected, the service 958 may select an appropriate execution platform from a pool of existing platforms, or instantiate a new execution platform, run the requested program there, and provide results of the execution to a destination specified by the client. In contrast, before using resources of the virtualized computing service, a client may typically have to request that a particular computing platform 905 (e.g., a virtual machine) be provisioned and allocated to the client.

The object storage service may interact with other services of the provider network in any of several ways in the depicted embodiment. Some clients of the provider network may run applications using the pre-allocated computing platforms 905 (e.g., 905A or 905B), and the results 982A of filtered access requests may be obtained at such pre-allocated computing platforms. For some types of machine learning-based applications, algorithms selected from a library 975, such as various deep learning algorithms, may be run using execution platforms 976 that are optimized (e.g., using graphics processing units or the like) specifically or machine learning. Filtered results 982B of access queries directed to objects containing input data for such applications may be transmitted to such optimized platforms 976 in the depicted embodiment. In some embodiments, requests to train some types of machine learning models (such as models used for tuning parameters of server-side filtering pipelines) may be handled as batch jobs at the machine learning service, and a batch job scheduler 979 may orchestrate the allocation of resources for the jobs as well as dependencies among jobs. In some embodiments, online/real-time analysis managers 977 of the MLS 971 may be used to determine the best approach to processing various aspects of a given filtered access request—e.g., whether its results should be cached or not. In one embodiment, programs used for evaluating filtering criteria may be executed using the event-driven server-less computing service, as indicated by arrow 981.

Query Evaluation Pipeline Optimizations

Figure 10:
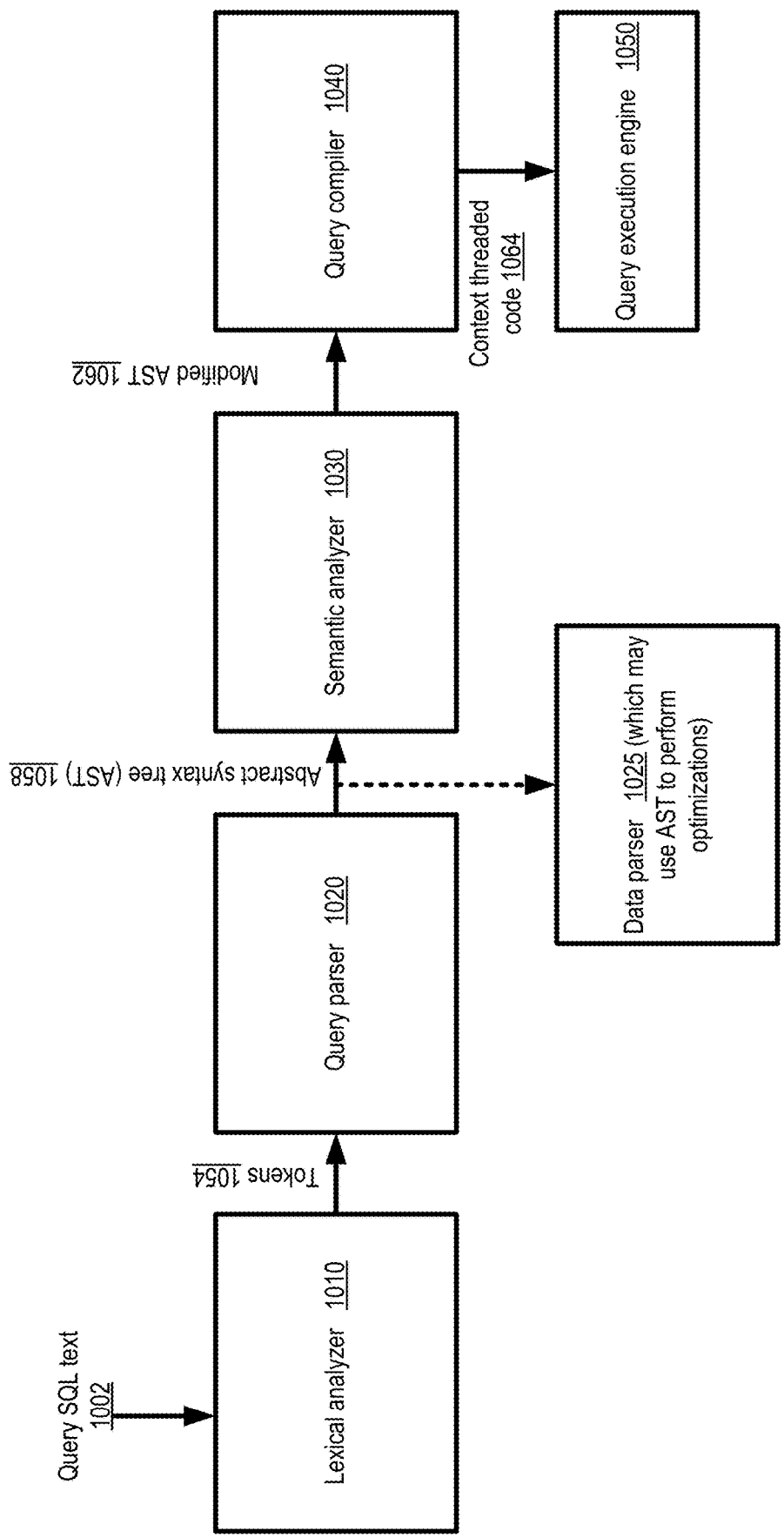
FIG. 10 illustrates an example query evaluation pipeline which may be implemented at a storage service, according to at least some embodiments.

In some embodiments, as mentioned earlier, the filtering requirements for a given access request directed to one or more unstructured data items may be expressed in the form of a query using a language similar to structured query language (SQL). FIG. 10 illustrates an example query evaluation pipeline which may be implemented at a storage service, according to at least some embodiments.

The text 1002 of an SQL query, which may be indicated as a parameter of a filtered access request, may be converted to a set of tokens 1054 by a lexical analyzer 1010 of the filtering subsystem of the object storage service in the depicted embodiment. The lexical analyzer may perform operations such as whitespace removal, case normalization, and so on. The tokens 1054 may be consumed as input by a query parser 1020 (distinct from the data parser 1025 which is used to parse the unstructured data item contents) in various embodiments. The query parser may transform the tokens into an abstract syntax tree (AST), which may then be passed to a semantic analyzer in the depicted embodiment. (An example of an AST is provided in FIG. 11.) The semantic analyzer may, at least in some cases, generated a modified version of the AST 1062 (e.g., based on optimizations identified by the analyzer). A query compiler may use the modified AST 1062 to generate context threaded code 1064 in at least some embodiments, which can then be run at a query execution engine 1050 to obtain the results of the query with respect to records extracted from one or more unstructured data items.

In addition to being used within the query execution pipeline shown in FIG. 10, abstract syntax trees may be utilized in several other ways within the filtering subsystem of the object storage service in some embodiments. For example, in at least some embodiments the AST generated by a query parser in response to a submitted filtered access request may be made available to a data parser 1025, which may use the AST to optimize some of its own operations, such as by abandoning further parsing of some records based on character-level shortcut tests of the kinds discussed below. In one embodiment, abstract syntax trees may also be used to mask or obfuscate sensitive data within log records generated in response to filtered access requests, as also discussed below.

Figure 11:
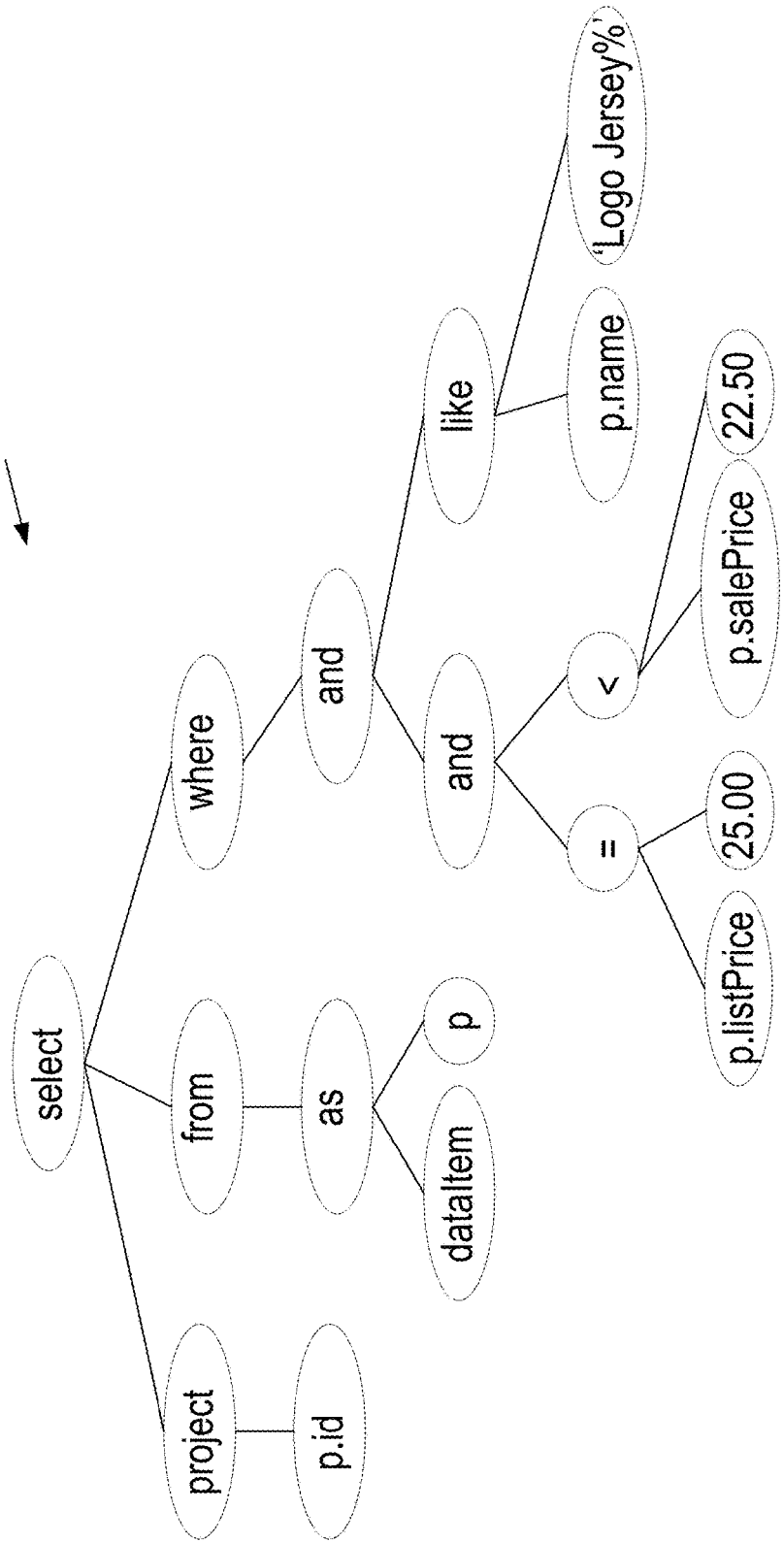
FIG. 11 illustrates an example abstract syntax tree which may be obtained from a filtering request at a storage service and provided to various stages of a server-side filtering pipeline, according to at least some embodiments.

FIG. 11 illustrates an example abstract syntax tree which may be obtained from a filtering request at a storage service and provided to various stages of a server-side filtering pipeline, according to at least some embodiments. In the depicted example, the filtering criterion for an access request directed to records extracted from one or more unstructured data item is expressed as a select query 1110, in which an identifier field (id) is to be returned from those records whose list price (p.ListPrice), sale price (p.salePrice), and name (p.name) satisfy specified predicates. The corresponding abstract syntax tree 1120 contains 19 nodes rooted at a "select" node.

In effect, from the string version 1110 of the filter query, a set of tokens that are useful with respect to generating the code used to execute the query may be extracted during query parsing, with white spaces (and in some cases, other non-useful characters) removed. The meaningful tokens may then be arranged in a tree format as shown, which reveals the semantics or meanings of the comparisons that are to be made to determine the result set of the query. As shown, in some cases, one or more nodes of an abstract syntax tree may contain literals or constants (such as the nodes comprising the numeric values "25.00" and "25.00"), while others may contain a combination of constants and variables (e.g., 'Logo Jersey %', in which % may represent a variable that can take on different values). Such literals/constants may, in some cases, potentially reveal sensitive information, and may therefore be obfuscated before the query text is logged as discussed below.

Figure 12:
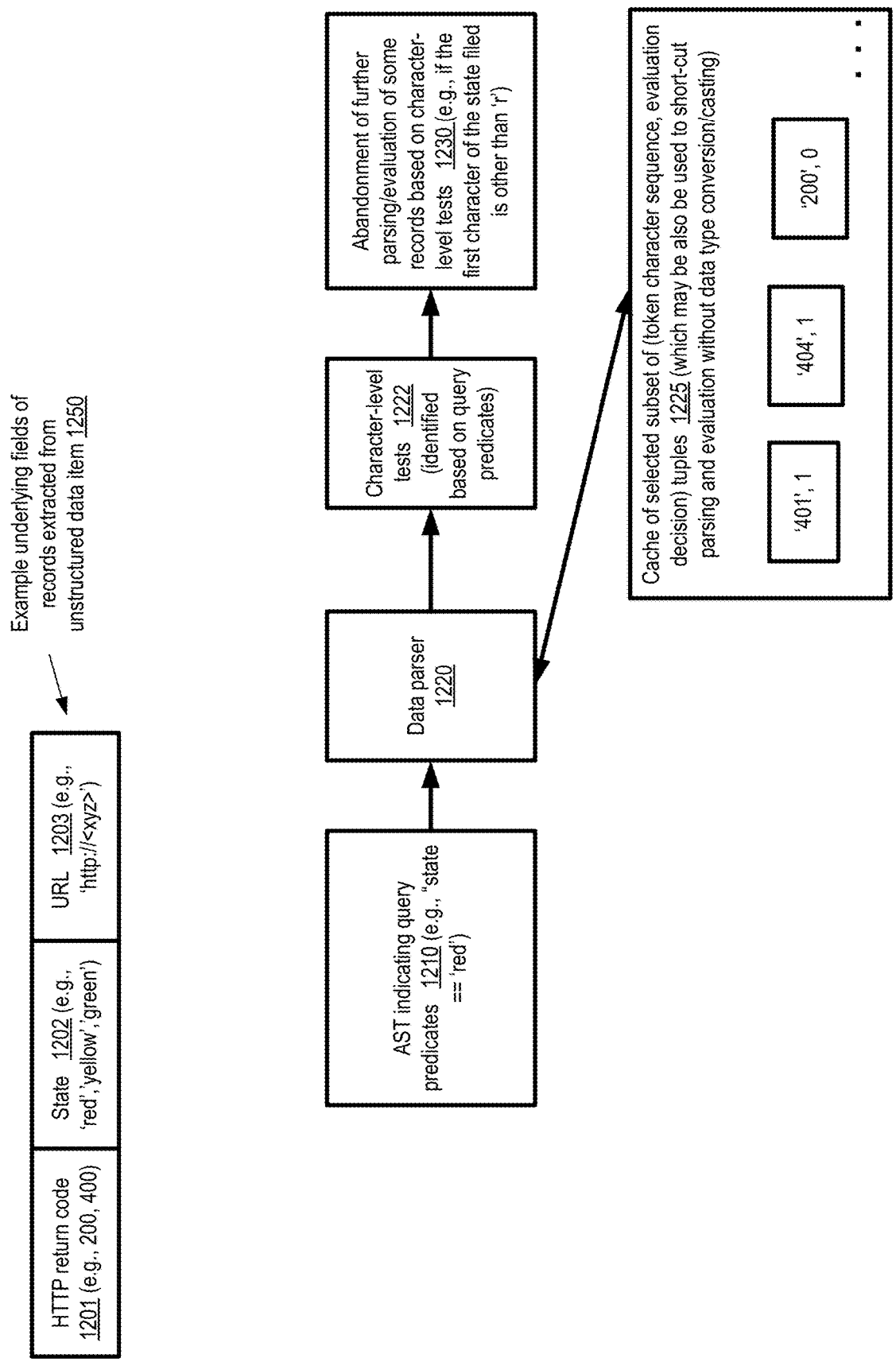
FIG. 12 illustrates examples of techniques which may be employed to optimize operations a server-side filtering pipeline, according to at least some embodiments.

FIG. 12 illustrates examples of techniques which may be employed to optimize operations a server-side filtering pipeline, according to at least some embodiments. Consider a simplified example set of records extracted from one or more unstructured data items or objects, where each record comprises three fields 1250: an HTTP (Hypertext Transfer Protocol) return code field 120, a state field 1202 and a URL (Universal Record Locator) field 1203. A given record in this example, may, for example, represent a respective HTTP request received and processed at some web site. Some of the common values for the HTTP return code field may include 200, 400, 404, etc. The state values may be selected from an enumeration such as "red", "yellow", "green" and the like in the depicted example scenario, while the URL fields may contain the HTTP addresses of various web sites.

A filtered access request may be received, indicating one or more predicates that are to be evaluated with respect to the fields of the extracted records to determine whether various records are part of the result set or not. In the depicted embodiment, an abstract syntax tree (AST) representation 1210 of the filtering criterion, indicating the query predicates (such as "state 'red'"), may be provided to a data parser 1220 which is extracting the fields of the records from the underlying unstructured data items. In at least some cases, using the query predicates indicated in the AST, the data parser 1220 may be able to identify one or more character-level tests 1222 that can be used to shorten the overall parsing and evaluation workload. For example, if a query predicate indicates that a record's state field 1202 has to have the value 'red' for the record to be included in the result set, a test to check whether the first character of the state field is 'r' or not may be used as a shortcut in the depicted embodiment. Based on the results of the character-level tests 1222 identified with the help of the AST, further parsing and evaluation of at least some records may be abandoned in the depicted embodiment, as indicated in element 1230, and the parser may proceed on to the next record.

Another approach to reducing the amount of processing performed to implement a filtering condition may comprise storing tuples indicating correlations between frequently-observed field character-level contents, and the final result of the query evaluation for the records containing the fields in some embodiments. For example, if records in which the character sequence corresponding to the HTTP return code is '401' are always included in the query result set, a tuple ('401', 1) (where the "1" indicates that the record satisfied the query predicate) may be stored in a cache 1225 in some embodiments. Similarly, cached tuples ('404', 1) and ('200', 0) may be cached to indicate that the character sequence '404' leads to inclusion in the result set, while the character sequence '200' leads to exclusion from the result set in the depicted example. After such entries are cached, as the character sequences of the HTTP return code field are being parsed, the data parser 1220 may also be able to abandon further parsing of at least some records using the cache entries. E.g., as soon as the character sequence '401', '404' or '200' is detected with a record, no further parsing or query evaluation may be required for the record as the final result of the query evaluation would be known from the corresponding cached tuple.

Figure 13:
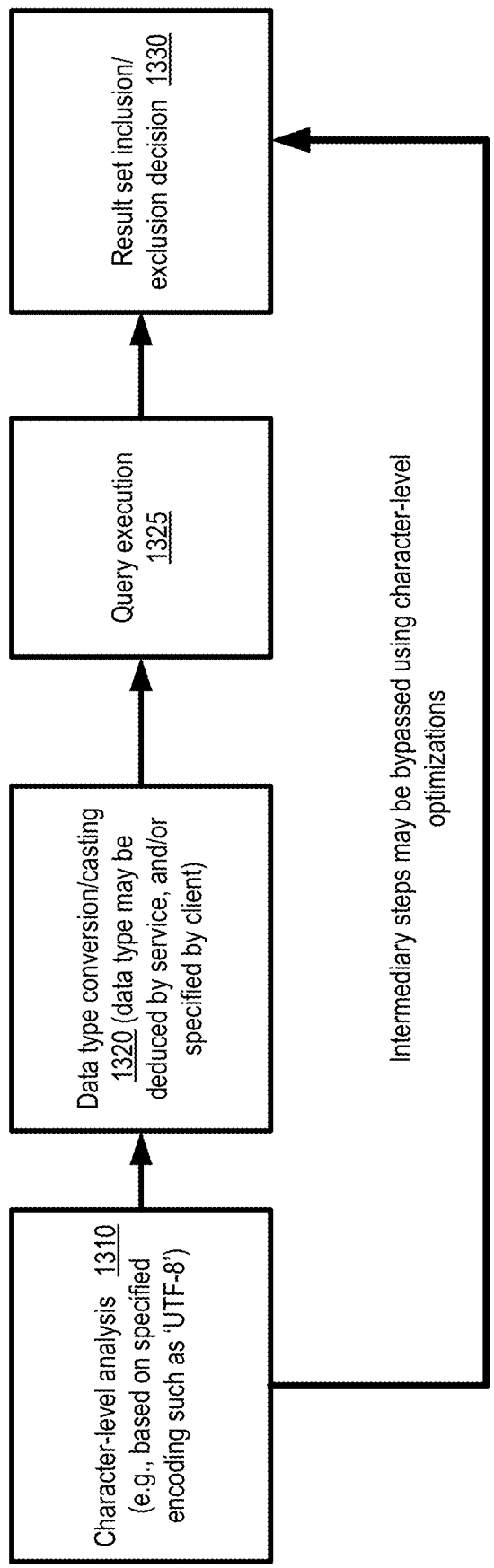
FIG. 13 illustrates an example bypassing of one or more stages of a server-side filtering pipeline at an object storage service, according to at least some embodiments.

FIG. 13 illustrates an example bypassing of one or more stages of a server-side filtering pipeline at an object storage service, according to at least some embodiments. In the depicted embodiment, the default (un-optimized) stages of a server-side pipeline used to determine whether a particular record extracted from an unstructured data item may include character-level analysis 1310 to identify a set of tokens, followed by data type conversion or casting 1320 of the tokens and query execution 1325 on the results of the conversion/casting, which ultimately leads to a decision 1330 as to whether the record is to be included in or excluded from the result set.

In at least some embodiments, a submitted filtered access request may include an indication of a character encoding (e.g., UTF-8) which is to be used to interpret the contents of the targeted unstructured data items, and the encoding may be used to extract tokens (e.g., reserved words, literals, comparison operators, and the like) during the character-level analysis 1310. The data types of various tokens or fields identified during the character-based analysis may be indicated by the client in some embodiments, e.g., as part of the filtered access request. In other embodiments, the object storage service may infer the data types to which the raw characters are to be converted, e.g., based on examining the characters and/or based on examining the predicates of the filtering criteria or query.

Using one or more character-level optimizations such as those discussed in the context of FIG. 12, one or more of the intermediate stages of the pipeline may be skipped or bypassed in at least some embodiments. For example, the use of the shortcuts may enable at least a subset of data type conversion/casting operations 1320 to be avoided, and/or query execution 1325 to be avoided for some records. In some cases, parsing or character-level analysis of a portion of some records may also be avoided—e.g., if examining the first few characters of the record enables a shortcut to be taken.

Obfuscation of Sensitive Data

Figure 14:
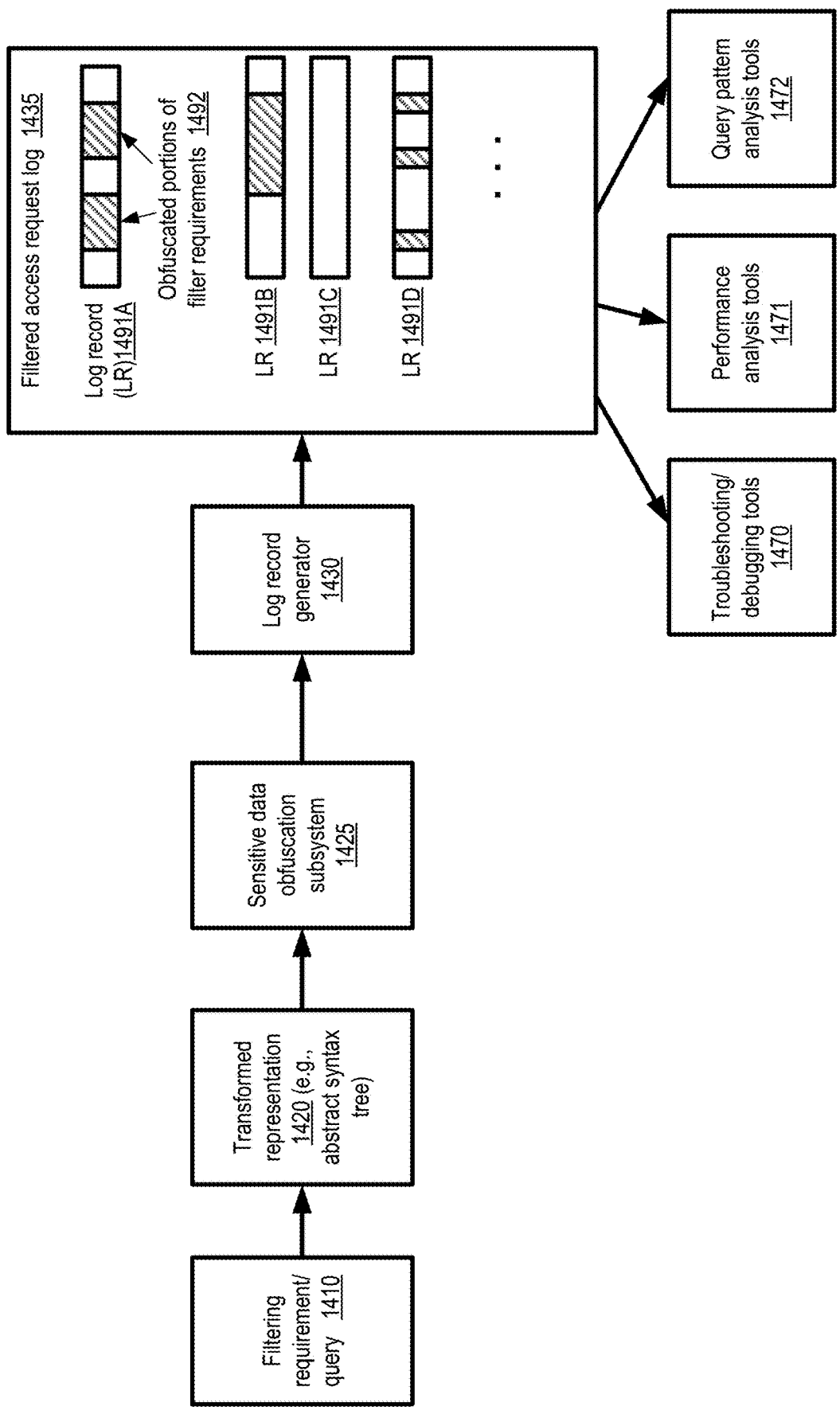
FIG. 14 illustrates an example scenario in which sensitive data associated with filtering requests may be obfuscated within log records generated at an object storage service, according to at least some embodiments.

As mentioned earlier, at least some of the data items stored at an object storage service may comprise opaque collections of bytes by default. When a client submits a filtered access request, the filtering criteria may in some cases potentially reveal sensitive information about the contents of the targeted data items. If records that indicate the filtering criteria are stored at the storage service, such records may also potentially reveal sensitive information. FIG. 14 illustrates an example scenario in which sensitive data associated with filtering requests may be obfuscated within log records generated at an object storage service, according to at least some embodiments.

When a filtered access request is received at the object storage service, a transformed representation 1420 of the filtering requirements or query 1410 indicated in the request may be generated in various embodiments. In some embodiments in which the filtering requirements are expressed in the form of an SQL-like query comprising a plurality of text tokens, for example, the transformed representation may comprise an abstract syntax tree of the kind discussed earlier. The transformed representation 1420 may indicate the semantics or meanings of various tokens in the depicted embodiment, including tokens (such as literal or constants) which may contain private or confidential data to which the client that submitted the filtered access request may wish to limit visibility. For example, if the filtering requirement for a particular access request contained a query predicate similar to "where salary >$200000", and a log record indicating the literal $200000 as a value for salary were stored at the object storage service, the literal $200000 may indicate confidential salary-related information that the client may not wish to reveal to anyone analyzing the log records.

The transformed representation 1420 may be ingested as input by a sensitive data obfuscation subsystem 1425 in some embodiments. At the sensitive data obfuscation subsystem 1425, using the transformed representation 1420, a target set of one or more tokens of the filtering criteria may be identified as candidates for obfuscation within a log record to be generated with respect to the access request in the depicted embodiment. A number of different algorithms may be used to detect potentially sensitive data in different embodiments, and any of several obfuscation methodologies may be employed; examples of techniques which may be used to detect and respond to the sensitive data are discussed in further detail below in the context of FIG. 15. In some embodiments, substitute or dummy versions of the target tokens may be generated for inclusion in log records. For example, with respect to a target token T1, a substitute token ST1 may be generated which matches the original token T1 in one or more properties, so that while the log record corresponding to the access request containing T1 does not reveal private or confidential information, it still includes some potentially useful information for the purposes of debugging, performance analysis and the like. If original token T1 is a string of length L characters, in one embodiment the substitute token ST1 may also be generated as a string of length L1 characters (although the characters of ST1 may be selected at random); similarly, if the original token T1 represents an integer of length N decimal digits, another integer of length N digits may be selected as ST1. In some embodiments, one or more of the obfuscated tokens may comprise non-text data, such as image, video or audio.

A log record generator 1430 may obtain the output, comprising for example a modified version of the original filtering criteria/query 1410, or a modified version of the transformed representation 1420, generated by the obfuscation subsystem 1425 in the depicted embodiment. Corresponding to individual ones of the filtered access requests, a respective log record (LR) 1491 (e.g., 1491A, 1491B, 1491C, 1491D) may be stored in a log 1435 by the log record generator 1430. As shown, in various embodiments, at least some of the log records (such as 1491A, 1491B, and 1491D) may comprise obfuscated portions 1492, corresponding to data that was substituted or redacted. Not all the log records may necessarily comprise obfuscated/substituted portions in some embodiments—e.g., some filtering requirements may not contain any sensitive data, so no substitutions or redactions may be required. In some embodiments, instead of generating substitutes, at least some tokens may be removed entirely from the versions of the filtering requirements that are stored in the log 1435. The log records 1491 may be used for various purposes in different embodiments at the object storage service, such as for analyses performed with the help of troubleshooting/debugging tools 1471, performance analysis tools 1472, and/or query pattern analysis tools 1473. The query pattern analysis tools 1473 may, for example, be used to predict filtering requirements of future access requests, which may in turn lead to various types of caching similar to the caching techniques discussed earlier.

In order to ensure that the analyses performed using the log records 1491 is meaningful, the versions of the filtering requirements stored in the obfuscated log records may have to retain some properties of the original filtering requirements in various embodiments; otherwise, the analyses may not be as useful as they could be. For example, consider a scenario in which, once every T minutes, a filtered access request with a query predicate similar to "address-city is 'New York'" is received at the object storage service. If a different substitute value for the literal 'New York' (e.g., by replacing the name of the city with random strings in the logged versions of the query predicate, as in "address-city is 'abcdefgh'", "address-city is 'dfgrthsg'") etc. is stored in each log record generated for the repeated requests, the potentially useful information that a query directed to the same city is received every 15 minutes may be lost. In some embodiments, a deterministic mapping function may be used when generating substitutes for at least some tokens. For example, the literal 'New York' in the above example may be mapped deterministically to the substitute literal such as 'cvfrbnht' of the same length, each time it is encountered in one embodiment. As a result, the log records generated for the repeat filtered access requests received every 15 minutes in the example would show identical repeated obfuscated versions of the predicate related to 'New York', which may be more helpful than if different randomized strings were used as substitutes.

Figure 15:
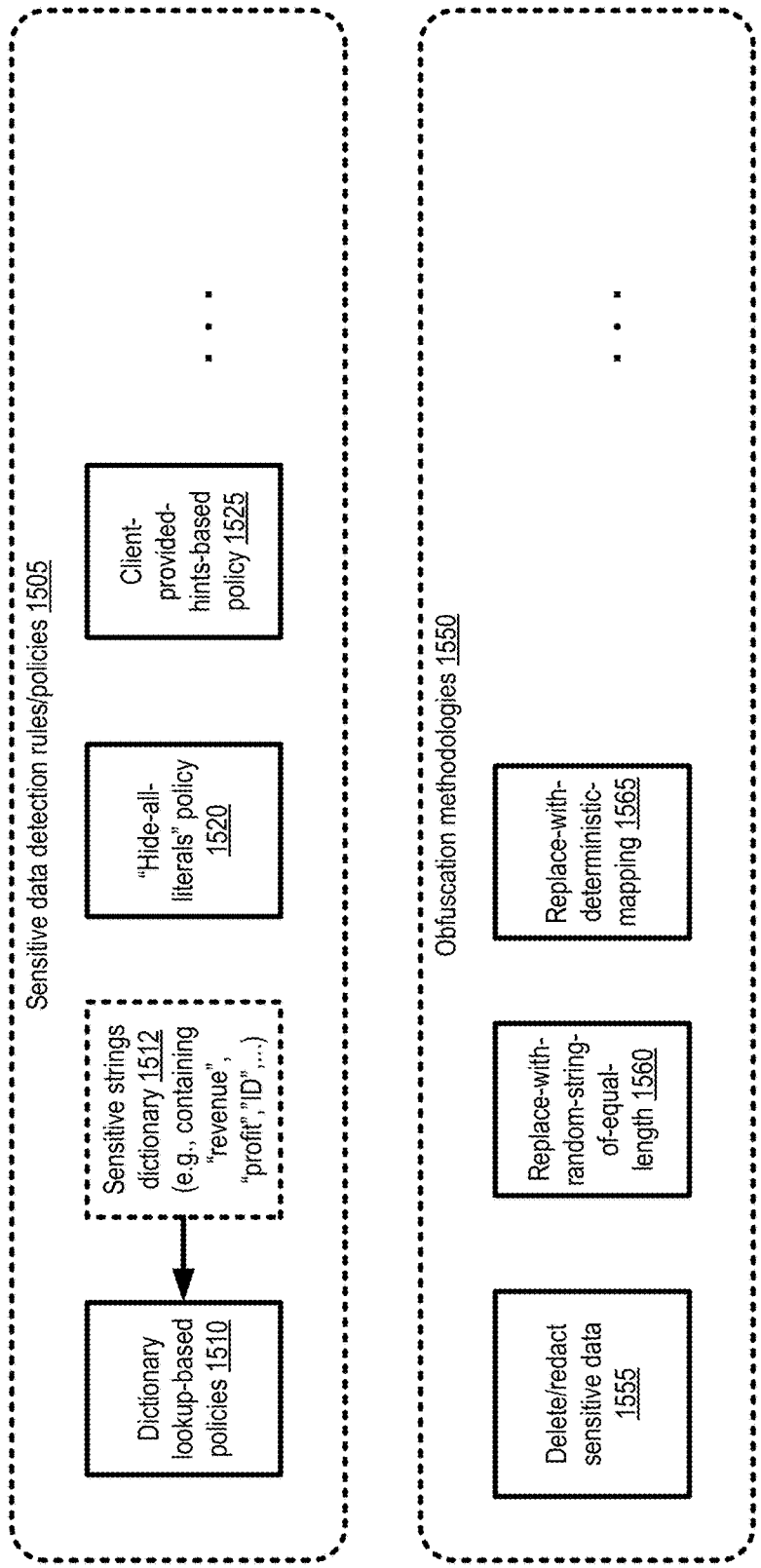
FIG. 15 illustrates example techniques for detecting the presence of sensitive data in filtering requests directed to an object storage service, as well as example obfuscation methodologies for the sensitive data, according to at least some embodiments.

FIG. 15 illustrates example techniques for detecting the presence of sensitive data in filtering requests directed to an object storage service, as well as example obfuscation methodologies for the sensitive data, according to at least some embodiments. As shown, sensitive data detection rules or policies 1505 may include, among others, dictionary lookup-based policies 1510, "hide-all-literals" policies 1520, client-provided hints based policies 1525, and the like in various embodiments. In one embodiment in which a dictionary lookup-based policy 1510 is used, the object storage service may obtain or generate a sensitive strings dictionary 1512, containing string tokens (such as "revenue", "profit", "ID", "age" and the like) which, if used in a filtering requirement, may be assumed to potentially reveal private or confidential data. For example, a query predicate similar to "revenue >X" or "profit <Y" may be assumed to potentially reveal data that should be kept private. When a new access request with a filtering requirement is received, the tokens of the filtering requirement may be looked up in the dictionary 1512, and if matches are found, the corresponding value-containing tokens (e.g., X or Yin the above examples) may be obfuscated or redacted in some embodiments.

In at least one embodiment, a simpler "hide-all-literals" policy 1520 may be employed. According to such a policy, all constants or literals detected within filtering requirements may be obfuscated, e.g., by substitution or redaction, by default. As mentioned earlier, in at least some embodiments, deterministic mapping functions may be used when generating substitute literals, and/or one or more properties of the original literal tokens (such as string length or numeric length) may be retained. In some embodiments, clients may provide hints via programmatic interfaces supported by the object storage service, to indicate particular types of tokens/predicates/queries that should be obfuscated. In one such embodiment in which such a client-provided-hints-based policy 1525 is employed, for example, a client may indicate that any filtering requirement which indicates a numeric value in a particular range should be obfuscated, or that a token which appears to be part of an address (e.g., if it contains a postal code, the words "Street", "Avenue" etc.) should be obfuscated, and so on. In effect, in some such embodiments, clients may indicate custom entries to be included in a sensitive-strings dictionary to be used by the object storage service to detect private/confidential data. In some embodiments, the contents of log records of filtered access requests may be obfuscated or modified in compliance with one or more privacy-related laws or regulations, e.g., laws similar to the General Data Protection Regulation (GDPR) of the European Union.

A number of different obfuscation methodologies 1550 may be employed in different embodiments to hide sensitive data identified using rules/policies 1505. In some embodiments, at least some tokens identified as containing or indicating sensitive data may simply be deleted or redacted from the filtering requirements or queries (methodology 1555). In at least one embodiment, the string of characters that make up a token which may contain sensitive data may be replaced with a random string of equal length, according to methodology 1560. In some embodiments, a methodology in which a deterministic mapping 1565 may be used to obtain a replacement token or tokens for the original tokens which have been identified as potentially comprising sensitive information. As discussed above, such deterministic mappings may be useful in retaining information about repeat occurrences of the same filtering criteria, or more generally for retaining information about patterns or trends which may occur in the filtering criteria used over time, while still hiding specifics of the filtering criteria. In one embodiment, combinations of several different obfuscation methodologies may be used, e.g., based on client-specified preferences, some tokens of filtering requirements/criteria may be deleted from the log records, others may be replaced with randomized strings or numerals, while deterministic mappings may be used for some tokens. Other obfuscation methodologies may be employed in some embodiments.

Methods for Implementing Server-Side Filtering

Figure 16:
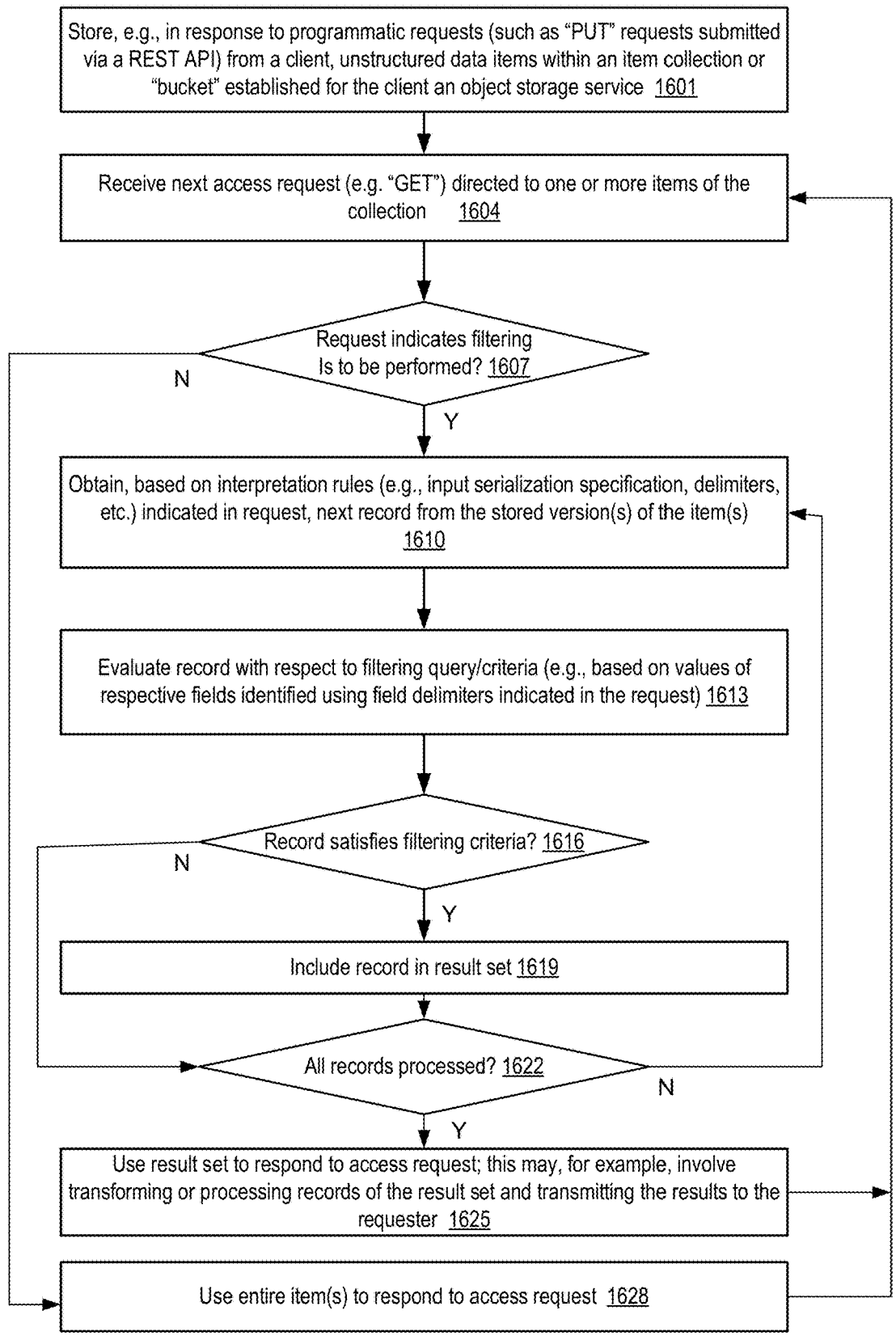
FIG. 16 is a flow diagram illustrating aspects of operations that may be performed to implement server-side filtering at an object storage service, according to at least some embodiments.

FIG. 16 is a flow diagram illustrating aspects of operations that may be performed to implement server-side filtering at an object storage service, according to at least some embodiments. As shown in element 1601, a number of unstructured data items (UDIs) may be stored at an object storage service on behalf of a client, e.g., within item collections or buckets created on behalf of the client. In at least some embodiments, such UDIs may be created in response to requests submitted by the clients via programmatic interfaces supported by the service, such as a set of web-services based application programming interface (APIs). In one embodiment, such APIs may include a "put" REST API for writes and/or a "get" REST API for access requests or reads. As mentioned earlier, the UDIs may comprise an opaque collection of bits or bytes from the perspective of the service by default, with no internal structure or semantics.

The next access request directed to one or more UDIs of one or more item collections may be obtained at the service (element 1604). Based on the parameters or arguments of the access request, a determination may be made as to whether filtering is to be performed at the service—e.g., whether a given UDI is to be transmitted to one or more destinations in its original form, or is to be interpreted as a collection of records on which filtering criteria are to be applied. If the service determines that filtering is not to be performed (as detected in operations corresponding to element 1607), a response comprising the entire UDI(s) may be prepared and transmitted to the destinations (e.g., to the requester) (element 1628).

If a determination is made that filtering on the UDI contents is to be performed prior to transmitting a response to the access request (also using operations corresponding to element 1607), interpretation/transformation rules indicated in the access request may be used to extract a formatted record from the raw data of a targeted UDI (element 1610). The interpretation rules may include various elements (e.g., similar to those discussed in the context of FIG. 3) in different embodiments, such as serialization descriptors, delimiters for demarcating records within a UDI and for distinguishing among fields within a given record, the labels or field names corresponding to the different fields identified within a given record, and so on. Note that different sets of interpretation/transformation rules may be indicated for a given UDI in respective access requests in some embodiments—that is, a given UDI may not necessarily be parsed/interpreted in the same way to generate the responses to all access requests directed to it. In one example scenario, the raw data of a given UDI may contain sensor data collected over time, with a first record delimiter (e.g., the string "|||") distinguishing individual samples of the sensor data, a second delimiter (e.g., the string "HHH") distinguishing groups of samples collected in different hours, and a third delimiter (e.g., the string "DDD") distinguishing samples collected on different days. In this example, depending on the application, the UDI may be subdivided into hourly collections of samples for some access requests, daily collections of samples for other access requests, and individual samples for some other access requests.

After a given record is extracted from the raw data of a UDI based on the interpretation guidelines, it may be evaluated with respect to the filtering criteria or query indicated in the access request in the depicted embodiment (element 1613), e.g., based on the values of respective fields identified using the field delimiters and/or field names indicated in the access request. If the record satisfies the filtering criteria (as detected in operations corresponding to element 1616), the record (or at least a portion thereof) may be included in a result set to be used for the response to the access request in various embodiments (element 1619). Records which do not satisfy the filtering criteria or query may not be processed further in at least some embodiments. In at least some embodiments, instead of extracting and then evaluating records one at a time, multiple (or all) records may first be extracted, and then the extracted set of records may be evaluated.

If a determination is made that all the records of the targeted UDI(s) have been processed (in operations corresponding to element 1622), the records which were included in the result set as a result of satisfying the filtering criteria or query may be used to generate, obtain or determine a response to the access request (element 1625) in the depicted embodiment. In some cases, further processing or formatting of the result set may be performed (e.g., based on output transformation rules of the kinds discussed in the context of FIG. 3), and the results of the processing may be transmitted as the response; in other cases, the formatted records may be transmitted as the response. If more records remain to be processed (as may also be detected in operations corresponding to element 1622), the operations corresponding to elements 1610 onwards may be repeated in various embodiments. After the response to the access request has been prepared and transmitted, operations corresponding to elements 1604 onwards may be performed for the next access request that is received in the depicted embodiment. Of course, in various embodiments, new unstructured data items may be stored and/or existing unstructured data items may be overwritten/modified over time—that is, write requests may be interspersed with read requests. In at least some embodiments, results of at least some filtered access requests may be cached, and/or some filtering operations may be performed proactively in anticipation of expected filtered access requests as discussed earlier.

Figure 17:
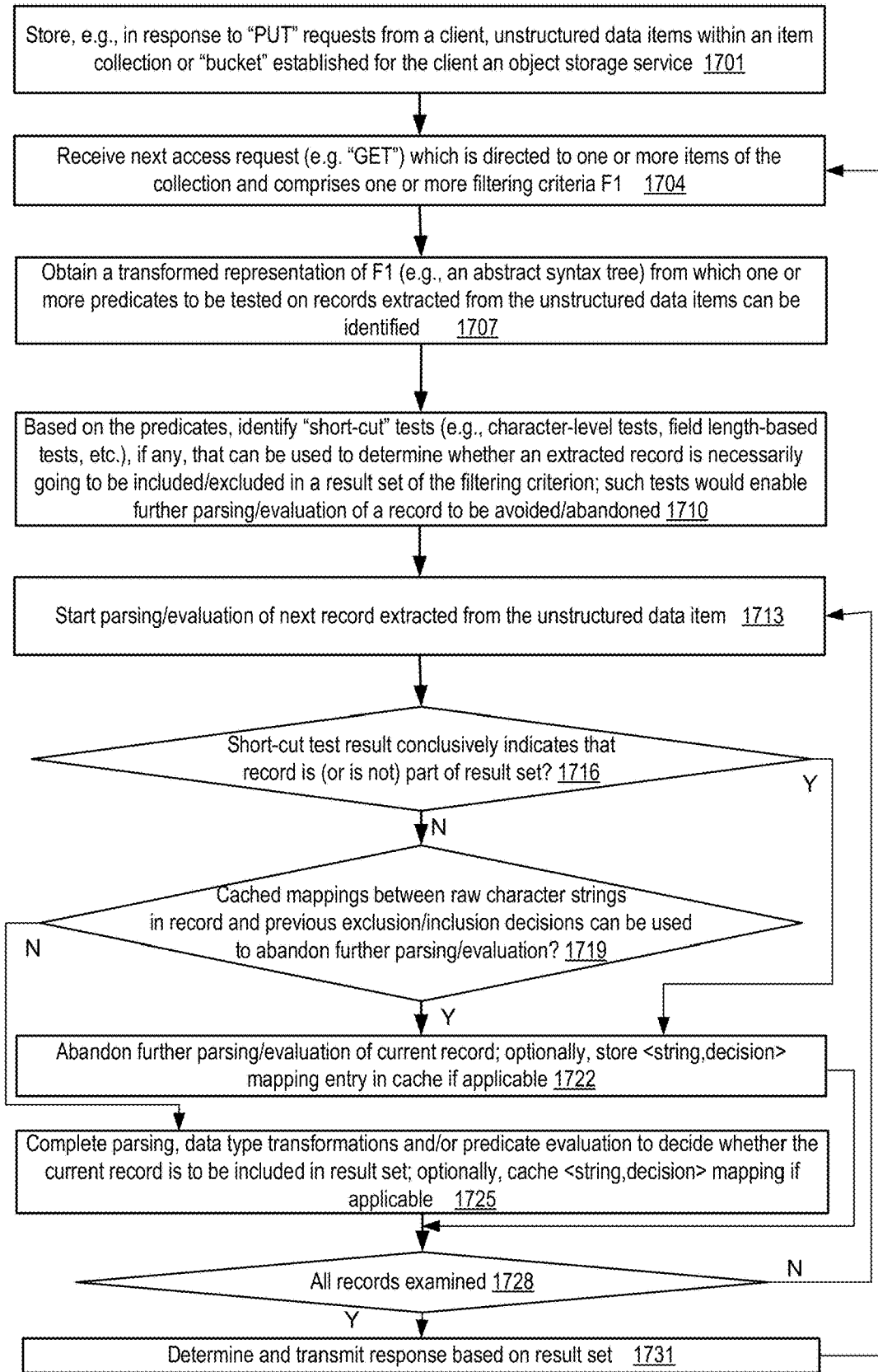
FIG. 17 is a flow diagram illustrating aspects of operations that may be performed to implement optimizations at a filtering pipeline of an object storage service, according to at least some embodiments.

FIG. 17 is a flow diagram illustrating aspects of operations that may be performed to implement optimizations at a filtering pipeline of an object storage service, according to at least some embodiments. As shown in element 1701, a number of unstructured data items (UDIs) may be stored at an object storage service on behalf of a client, e.g., within item collections or buckets created on behalf of the client. In at least some embodiments, such UDIs may be created in response to requests submitted by the clients via programmatic interfaces supported by the service, such as a set of web-services based application programming interface (APIs). In one embodiment, such APIs may include a "put" REST API for writes and/or a "get" REST API for access requests or reads. As mentioned earlier, the UDIs may comprise an opaque collection of bits or bytes from the perspective of the service by default, with no internal structure or semantics.

The next access request which contains one or more filtering criteria F1 (which may expressed, for example, using a query expressed in SQL-like syntax) and is directed to one or more UDIs of one or more item collections may be obtained at the service (element 1704). The filtering criteria may indicate conditions for including records extracted from the unstructured data items within a result set to be used to generate a response to the access request in various embodiments. In the depicted embodiment, a transformed representation of the filtering criteria, such as an abstract syntax tree or the like, from which one or more predicates to be tested on records extracted from the unstructured data items may be identified (element 1707).

Based at least in part on an analysis of the predicates indicated in the access request, in some embodiments one or more short-cut tests or optimizations for analyzing extracted records may be identified (element 1710). For example, such tests may be used to determine, prior to completing parsing and/or evaluation of an extracted record, whether the extracted record is necessarily going to be part of the result set corresponding to the filtering criteria or query. As a result, it may become possible to abandon/avoid further parsing, data type determination for various fields, and/or filter query evaluation for at least some records. Examples of such short-cut tests may include, among others, tests based on the number of characters or bytes used to store a given field of a record, comparisons of a subset of characters of a field, and so on in various embodiments.

The next record may be extracted from one of the targeted unstructured data items, e.g., using the input interpretation rules indicated in the access request, and parsing/evaluation of the contents of the extracted record may be begun (element 1713). One or more short-cut tests (if any such tests were identified based on the analysis of the filtering criteria) may be performed on a portion of the extracted record, and in some cases may conclusively indicate that the record is (or is not) part of the result set. If such a conclusive determination can be made, as determined in operations corresponding to element 1716, further parsing, data type conversion and/or evaluation of the extracted record may be abandoned (element 1722) in various embodiments. In at least some embodiments, short cut tuples indicating the correlations or mappings between specific strings or tokens in the extracted record, and the decision as to whether the record was included or excluded from the result set of the filtering criteria, may be stored in a cache.

If the short cut tests fail to provide a conclusive determination (also using operations corresponding to element 1716), in some embodiments a component of the object storage service may check a cache of short-cut mapping tuples to see if any such tuples can be used to short-circuit further processing of the record. Such a tuple may, for example, indicate whether the presence (or absence) of a particular raw character or byte string in a record field has been found to be correlated with a particular result set exclusion/inclusion decision with respect to records that were examined earlier. If a raw character sequence or byte sequence in the record being examined matches that of one of the cached tuples (as detected in operations corresponding to element 1719), the decision indicated in the tuple may be taken with respect to including or excluding the record from the result set, and used to abandon further parsing and processing of the records (element 1722).

In some cases, neither short-cut tests nor cached mapping tuples may enable the parsing of the extracted record to be abandoned in the depicted embodiment. In such a scenario, the default workflow for analyzing the extracted record may be completed (element 1725) in the depicted embodiment— e.g., the whole record may be parsed, data type transformations or casts may be performed on the fields extracted from the record, and/or predicate evaluation tests corresponding to the filtering criteria may be run to determine whether to include the record in the result set, or to exclude the record in the result set. If more records remain to be examined, the operations corresponding to elements 1713 onwards may be repeated for the next record in the depicted embodiment. After all the records of the targeted unstructured data items have been examined (element 1728), a response to the filtered access request may be determined, generated or obtained and transmitted to one or more destinations using the result set (element 1731) in various embodiments. Operations corresponding to elements 1704 onwards may be repeated for each new filtered access request in at least some embodiments.

Figure 18:
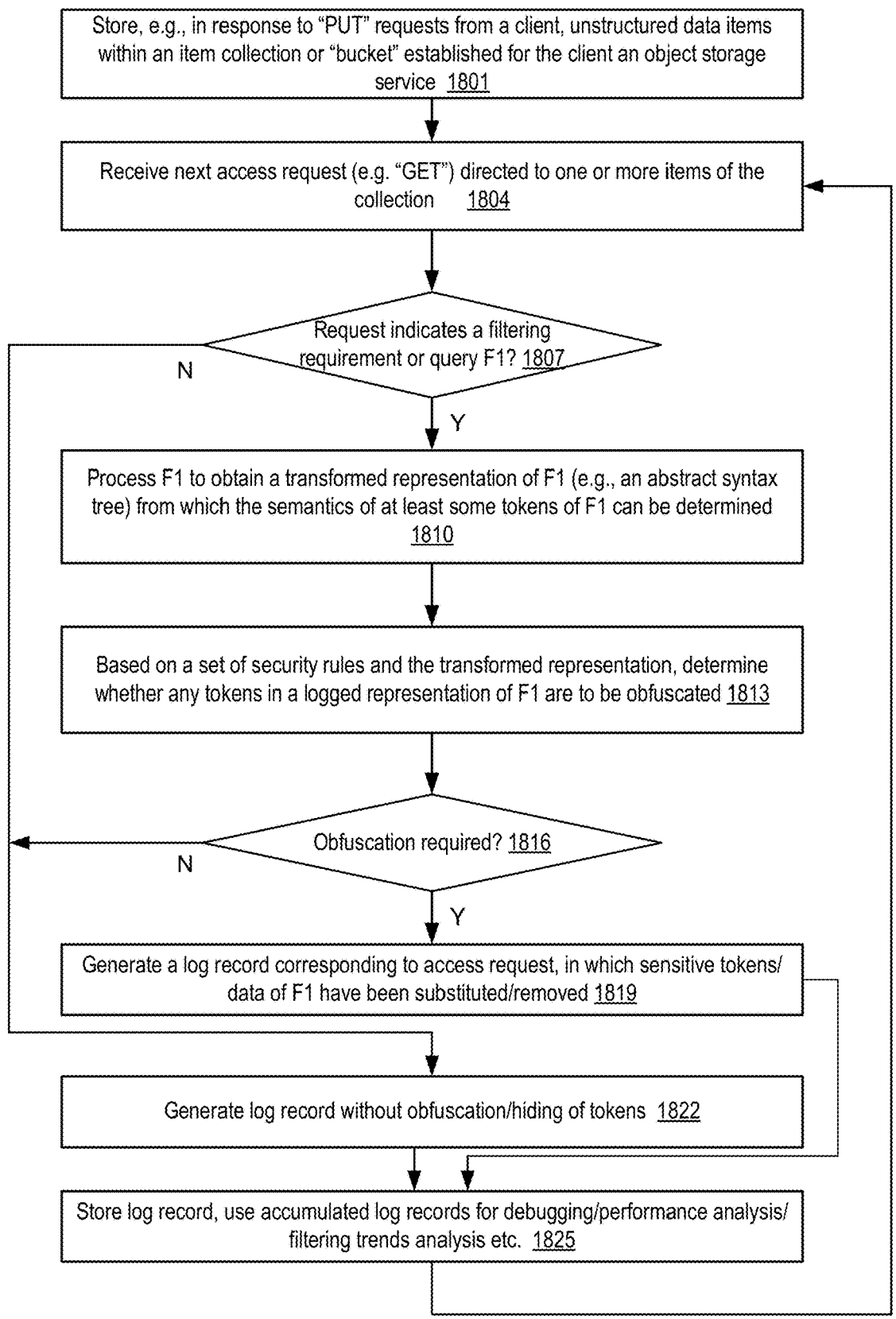
FIG. 18 is a flow diagram illustrating aspects of operations that may be performed to obfuscate sensitive data in log records generated at an object storage service, according to at least some embodiments.

FIG. 18 is a flow diagram illustrating aspects of operations that may be performed to obfuscate sensitive data in log records generated at an object storage service, according to at least some embodiments. As shown in element 1801, a number of unstructured data items (UDIs) may be stored at an object storage service on behalf of a client, e.g., within item collections or buckets created on behalf of the client. In at least some embodiments, such UDIs may be created in response to requests submitted by the clients via programmatic interfaces supported by the service, such as a set of web-services based application programming interface (APIs). In one embodiment, such APIs may include a "put" REST API for writes and/or a "get" REST API for access requests or reads. As mentioned earlier, the UDIs may comprise an opaque collection of bits or bytes from the perspective of the service by default, with no internal structure or semantics.

The next access request is directed to one or more UDIs of one or more item collections may be obtained at the service (element 1804). The access request may be examined to determine whether it indicates a filtering requirement or query F1 comprising a collection of tokens in at least some embodiments; such filtering criteria may, for example, indicate conditions for including records extracted from the unstructured data items within a result set to be used to generate a response to the access request in various embodiments. In the depicted embodiment, if the access request comprises such filtering criteria (as detected in operations corresponding to element 1807), a transformed representation of the filtering criteria may be generated, from which the semantics associated with one or more tokens of the filtering criteria may be determinable (element 1810). For example, in at least one embodiment, an abstract syntax tree may be generated from the filtering criteria.

Based at least in part on a set of security rules and the transformed representation, a determination may be made whether any tokens in a logged representation of F1 are to be obfuscated in the depicted embodiment (element 1813). The security rules may be set up based on input received from the client on whose behalf the unstructured data items are stored in some embodiments; in other embodiments, the object storage service may generate the rules. If obfuscation is not required (as determined in operations corresponding to element 1816), or if the access request did not include a filtering criterion (as detected in operations corresponding to element 1807), a log record representing the access request may be generated and stored (element 1822), without obfuscating or hiding any of the tokens of the access request or filtering criteria. In contrast, if obfuscation is required (as also detected in operations corresponding to element 1816), a log record in which at least some tokens comprising potentially sensitive data have been substituted or removed may be generated and stored (element 1819) in the depicted embodiment. The log records may be utilized at the object storage service for various purposes, including foOr example debugging, performance analysis, analysis of trends in service usage (which may be used to perform proactive filtering as described above), and the like. Operations corresponding to elements 1804 onwards may be repeated in some embodiments for each new access request. A number of different techniques may be used to identify which (if any) tokens in a filtering requirement or criterion may constitute sensitive data in different embodiments—e.g., dictionaries of sensitive terms may be consulted, all literals/constants may be considered sensitive, and/or client-specified preferences or hints may be used to identify the tokens to be obfuscated. In some embodiments in which substitute tokens are generated, tokens of the same length as the original tokens, or tokens which share some properties with the original tokens, may be produced for inclusion in the log records as discussed earlier.

It is noted that in various embodiments, some of the operations shown in FIG. 16, FIG. 17 and/or FIG. 18 may be implemented in a different order than that shown in the figure, or may be performed in parallel rather than sequentially. Additionally, some of the operations shown in FIG. 16, FIG. 17 and/or FIG. 18 may not be required in one or more implementations.

Use Cases

The techniques described above, of performing server-side filtering of unstructured data items at an object storage service, may be useful in a variety of scenarios. More and more organizations store their data at network-accessible storage services in the cloud, including services whose data model supports objects of arbitrary size represented as unstructured collections of bytes that can be accessed using web services interfaces. The raw data items stored at such services may often be extremely large, and not all the data included within a given item may eventually have to be read for some types of processing applications run by the clients on whose behalf the items were initially stored. If a client is able to specify interpretation rules for the unstructured data items, and succinctly indicate filtering criteria (e.g., using languages similar to SQL, regular expressions or the like) that can be tested to identify subsets of the stored data that are to be retrieved, considerable savings in network bandwidth, memory and processing at client-side computing devices may be achieved. In addition transformations, such as format conversion from comma-separated-variable (CSV) to JSON or the like, may be performed much closer to the stored version of the data, using powerful computing capabilities available at the service, instead of having to be performed at client-side devices. To further optimize the rate at which data can be filtered, optimizations of various types, including short-cut tests derived from analyzing the filtering criteria predicates, may be performed at the service; such tests may in some cases reduce the work required for filtering by an order of magnitude or more. Of course, by providing interpretation rules and filtering criteria, a client may reveal details regarding the content of the items stored at the service; to ensure that any potentially sensitive data is safeguarded, records of client-submitted requests may be generated in such a way that the sensitive data is obfuscated or removed.

Illustrative Computer System

Figure 19:
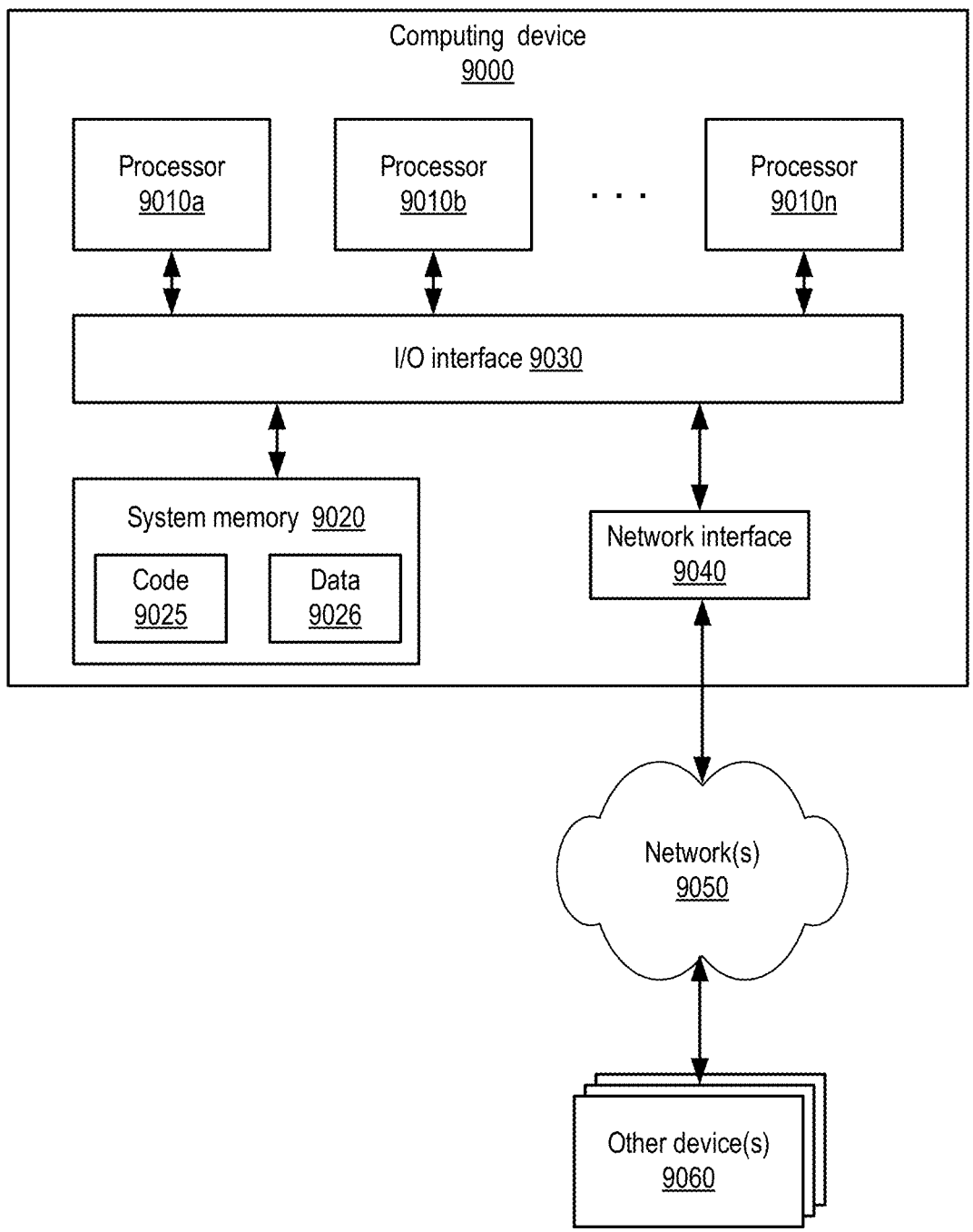
FIG. 19 is a block diagram illustrating an example computing device that may be used in at least some embodiments.

In at least some embodiments, a server that implements a portion or all of one or more of the technologies described herein, including the various components of an object storage service, such as components of a filtering subsystem, physical storage subsystem, monitoring/logging subsystem, machine learning subsystem and the like may include a general-purpose computer system that includes or is configured to access one or more computer-accessible media. FIG. 19 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 18, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 18 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 19 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an object storage service;
wherein the one or more computing devices include instructions that upon execution on a processor cause the one or more computing devices to:
store, in response to one or more programmatic requests, a plurality of unstructured data items of an item collection at a first set of one or more storage devices, wherein the plurality includes a first unstructured data item;
obtain a first programmatic request to retrieve at least a portion of contents of the first unstructured item collection;
in response to determining that the first programmatic request comprises a first input serialization specification and a first filter query,
obtain, from the one or more storage devices using the first input serialization specification, (a) a first formatted record corresponding to at least a first portion of the first unstructured data item and (b) a second formatted record corresponding to at least a second portion of the first unstructured data item;
obtain a response to the first request, based at least in part on a determination that the first formatted record satisfies at least one predicate of the first filter query, and based at least in part on a determination that the second formatted record does not satisfy at least one predicate of the first filter query; and
transmit the response to one or more destinations.

2. The system as recited in claim 1, wherein the first request comprises a first output transformation specification, and wherein the instructions upon execution on a processor cause the one or more computing devices to:
generate, based at least in part on the first output transformation specification, a transformed version of at least a portion of the first formatted record; and
include, in the response, the transformed version.

3. The system as recited in claim 1, wherein the instructions upon execution on the processor cause the one or more computing devices to:
cache a first result set corresponding to the first filter query at a second set of devices, wherein the result set comprises at least a portion of the first formatted record;
determine that a result set corresponding to a second filter query can be obtained using at least a portion of the first result set, wherein the second filter query is indicated in a second programmatic request; and
determine a response to the second programmatic request without accessing the first set of storage devices.

4. The system as recited in claim 1, wherein to obtain the first programmatic request, the instructions upon execution on the processor cause the one or more computing devices to:
determine that a REST API (Representational State Transfer application programming interface) has been invoked.

5. The system as recited in claim 1, wherein the first formatted record is obtained based at least in part on a first record delimiter indicated in the first input serialization specification, wherein the instructions upon execution on the processor cause the one or more computing devices to:
in response to determining that a second programmatic request directed to the first unstructured data item comprises a second input serialization specification and a second filter query, wherein the second input serialization specification indicates a second record delimiter,
obtain, from the one or more storage devices using the second record delimiter, a third formatted record corresponding to at least a third portion of the first unstructured data item, wherein the third portion overlaps at least in part with the first portion, and wherein the third portion overlaps at least in part with the second portion; and
generate, using the second filter query, a response to the second programmatic request, wherein the response to the second programmatic request includes at least a portion of the third formatted record.

6. A method, comprising:
performing, by one or more computing devices of an object storage service;
storing a plurality of unstructured data items of an item collection, including a first unstructured data item;
in response to determining that a first programmatic request directed to at least a portion of the item collection comprises a first input interpretation rule and a first filtering criterion,
obtaining, using the first input interpretation rule, (a) a first record corresponding to at least a first portion of the first unstructured data item and (b) a second record corresponding to at least a second portion of the first unstructured data item;
obtaining a response to the first programmatic request, based at least in part on a determination that the first record satisfies the first filtering criterion, and based at least in part on a determination that the second record does not satisfy the first filter criterion.

7. The method as recited in claim 6, wherein the first programmatic request comprises an output transform specification, wherein the response comprises a transformed version of at least a portion of the first record, and wherein the transformed version is obtained using the output transform specification.

8. The method as recited in claim 6, wherein obtaining the first record comprises accessing a first set of storage devices, the method further comprising performing, by the one or more computing devices:
caching a first result set corresponding to the first filtering criterion at a second set of devices, wherein the result set comprises at least a portion of the first record;
determining that a result set corresponding to a second filtering criterion can be obtained using at least a portion of the first result set, wherein the second filtering criterion is indicated in a second programmatic request; and
obtaining a response to the second programmatic request without accessing the first set of storage devices.

9. The method as recited in claim 8, further comprising performing, by the one or more computing devices:
determining, prior to caching the first result set, that a caching permission with respect to the first result set has been granted by a client of the object storage service.

10. The method as recited in claim 6, further comprising performing, by the one or more computing devices:
obtaining an indication, via a programmatic interface, of one or more field-level access permission settings for records extractable from a second unstructured data item of the item collection, wherein individual ones of the records extractable from the second unstructured data item comprise one or more fields; and verifying, prior to providing a response to a second programmatic request directed at least to the second unstructured data item, wherein the second programmatic request includes a second input interpretation rule and a second filtering criterion, that providing the response would not violate the one or more field-level access permission settings.

11. The method as recited in claim 6, wherein the first programmatic request is received from a first client of the object storage service, the method further comprising performing, by the one or more computing devices:

obtaining, based at least in part on analysis of one or more of (a) a set of previously submitted programmatic requests directed to the item collection or (b) contents of metadata pertaining to the item collection, a predicted filtering criterion of a future programmatic request from the first client;

obtaining, from the item collection, a result set corresponding to the predicted filtering criterion prior to receiving a programmatic request comprising the predicted filtering criterion, wherein the result set comprises at least a portion of the first record;

storing the result set corresponding to the predicted filtering criterion in a cache; and providing, using the cache, a response to a second programmatic request received from the client.

12. The method as recited in claim 6, further comprising performing, by the one or more computing devices:

collecting respective sets of metrics from one or more stages of a filtering pipeline, wherein the filtering pipeline comprises at least a parsing stage and a predicate evaluation stage, and wherein the filtering pipeline is used to determine whether the first record satisfies the first filtering criterion;

tuning, based at least in part on a machine learning-based analysis of the respective sets of metrics, one or more parameters of at least one stage of the one or more stages.

13. The method as recited in claim 12, wherein a first parameter of the one or more parameters comprises one or more of: (a) a number of concurrent threads of execution or (b) a record batch size.

14. The method as recited in claim 6, wherein the first programmatic request is received via a web services application programming interface (API).

15. The method as recited in claim 6, wherein the first filtering criterion is expressed in a language based at least in part on a version of Structured Query Language (SQL).

16. A non-transitory computer-accessible storage medium storing program instructions that when executed on one or more processors cause the one or more processors to:

store a plurality of unstructured data items of an item collection, including a first unstructured data item;

in response to determining that a first programmatic request directed to at least a portion of the item collection comprises a first input interpretation rule and a representation of a first filtering criterion, obtain, using the first input interpretation rule, (a) a first record corresponding to at least a first portion of the first unstructured data item and (b) a second record corresponding to at least a second portion of the second unstructured data item;

obtain a response to the first request, based at least in part on a determination that the first record satisfies the first filtering criterion, and based at least in part on a determination that the second record does not satisfy the first filtering criterion.

17. The non-transitory computer-accessible storage medium as recited in claim 16, wherein the first programmatic request comprises an output transform specification, wherein the response comprises a transformed version of at least a portion of the first record, and wherein the transformed version is obtained using the output transform specification.

18. The non-transitory computer-accessible storage medium as recited in claim 16, wherein the first record is obtained from a first set of storage devices, and wherein the instructions when executed on the one or more processors cause the one or more processors to:

cache a first result set corresponding to the first filtering criterion at a second set of devices, wherein the result set comprises at least a portion of the first record;

determine that a result set corresponding to a second filtering criterion can be obtained using at least a portion of the first result set, wherein the second filtering criterion is indicated in a second programmatic request; and obtain a response to the second programmatic request without accessing the first set of storage devices.

19. The non-transitory computer-accessible storage medium as recited in claim 16, wherein the first programmatic request is obtained from a first client of the object storage service, wherein the instructions when executed on the one or more processors cause the one or more processors to:

obtain, based at least in part on analysis of a set of previously submitted programmatic requests directed to the item collection, a predicted filtering criterion of a future programmatic request from the first client;

determine, from the item collection, a result set corresponding to the predicted filtering criterion prior to receiving a programmatic request comprising the predicted filtering criterion, wherein the result set comprises at least a portion of the first record;

store the result set corresponding to the predicted filtering criterion in a cache; and provide, using the cache, a response to a second programmatic request received from the client.

20. The non-transitory computer-accessible storage medium as recited in claim 16, wherein the first programmatic request comprises an indication of a compression algorithm used to store at least some data items of the item collection, and wherein to obtain the first record, the instructions when executed on the one or more processors cause the one or more processors to utilize a decompression algorithm corresponding to the compression algorithm.

* * * * *